(12) United States Patent
Peterson et al.

(10) Patent No.: US 11,998,785 B1
(45) Date of Patent: Jun. 4, 2024

(54) POLYMER-BASED COMPOSITE BEADS COMPRISED OF METAL-ORGANIC FRAMEWORKS AND METAL OXIDES FOR TOXIC CHEMICAL REMOVAL

(71) Applicant: U.S. Army Combat Capabilities Development Command, Chemical Biological Center, Apg, MD (US)

(72) Inventors: Gregory W Peterson, Belcamp, MD (US); Thomas H Epps, Newark, DE (US); John M Landers, Riverton, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 241 days.

(21) Appl. No.: 17/476,478

(22) Filed: Sep. 16, 2021

Related U.S. Application Data

(60) Provisional application No. 63/079,218, filed on Sep. 16, 2020.

(51) Int. Cl.
| | |
|---|---|
| *A62D 3/33* | (2007.01) |
| *A62B 17/00* | (2006.01) |
| *A62B 18/08* | (2006.01) |
| *A62D 3/35* | (2007.01) |
| *A62D 3/38* | (2007.01) |
| *A62D 5/00* | (2006.01) |
| *C08J 3/20* | (2006.01) |
| *A62D 101/02* | (2007.01) |
| *A62D 101/08* | (2007.01) |

(52) U.S. Cl.
CPC .............. *A62D 3/33* (2013.01); *A62B 17/006* (2013.01); *A62B 18/088* (2013.01); *A62D 3/35* (2013.01); *A62D 3/38* (2013.01); *A62D 5/00* (2013.01); *C08J 3/20* (2013.01); *A62D 2101/02* (2013.01); *A62D 2101/08* (2013.01); *C08J 2325/08* (2013.01); *C08J 2375/04* (2013.01)

(58) Field of Classification Search
CPC ...... A62D 3/33; A62D 17/006; A62D 18/088; A62D 3/35; A62D 3/38; A62D 5/00; A62D 2101/02; A62D 2101/08; C08J 3/20; C08J 2325/08; C08J 2375/04
USPC .......................................................... 588/315
See application file for complete search history.

(56) References Cited

U.S. PATENT DOCUMENTS

2004/0109853 A1 * 6/2004 McDaniel ................ C09D 5/34
424/94.63

FOREIGN PATENT DOCUMENTS

| DE | 3443900 C2 * | 3/1997 | ............ A62B 23/00 |
| EP | 1468732 A2 * | 10/2004 | ............ A62D 5/00 |

* cited by examiner

*Primary Examiner* — Edward M Johnson
(74) *Attorney, Agent, or Firm* — Ulysses John Biffoni

(57) ABSTRACT

A polymer-based material includes a polymeric binder and one or more porous active materials that adsorb, chemisorb, decompose, or a combination thereof, a hazardous chemical. The polymeric binder and the one or more porous active materials are combined to form a composite bead. The polymeric binder may include a polyurethane or a styrene-based block copolymer. The porous active materials may comprise metal-organic frameworks, metal oxides, metal hydroxides, and metal hydrates. The one or more porous active materials may be between 1 and 99 wt % of a total composite mass of the composite bead. Alternatively, the one or more porous active materials may be between 80 and 95 wt % of a total composite mass of the composite bead. The hazardous chemical may include a chemical warfare agent, a simulant of chemical warfare agents, and toxic industrial chemicals.

20 Claims, 27 Drawing Sheets

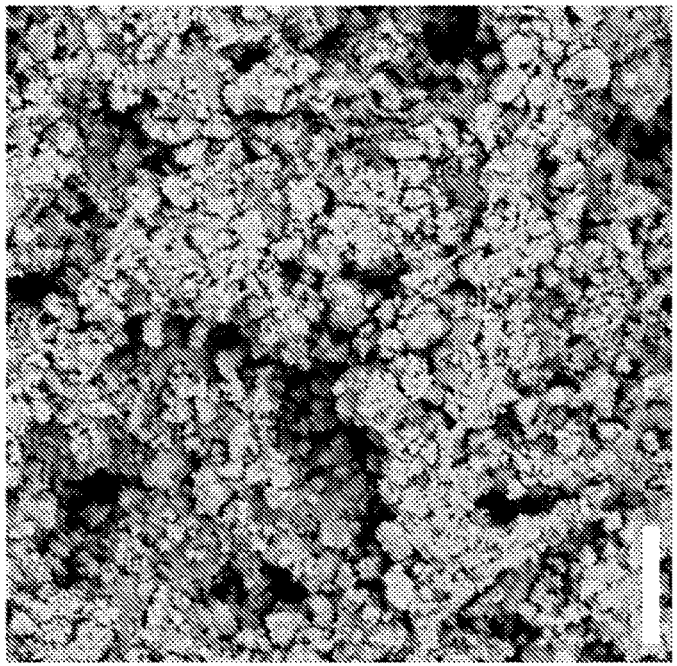
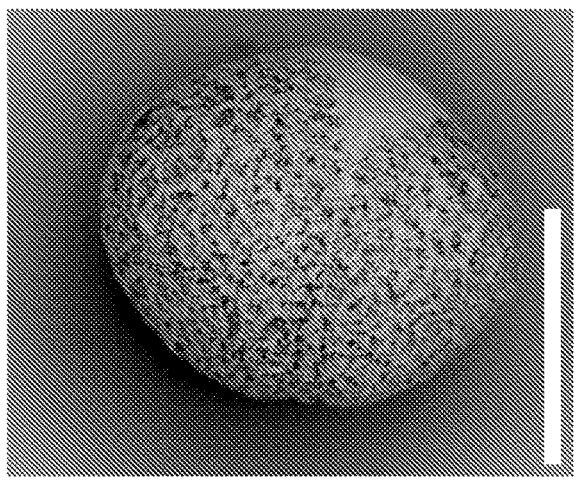
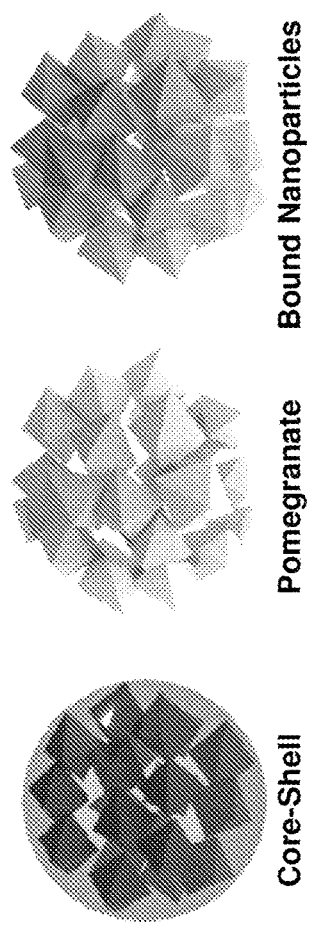

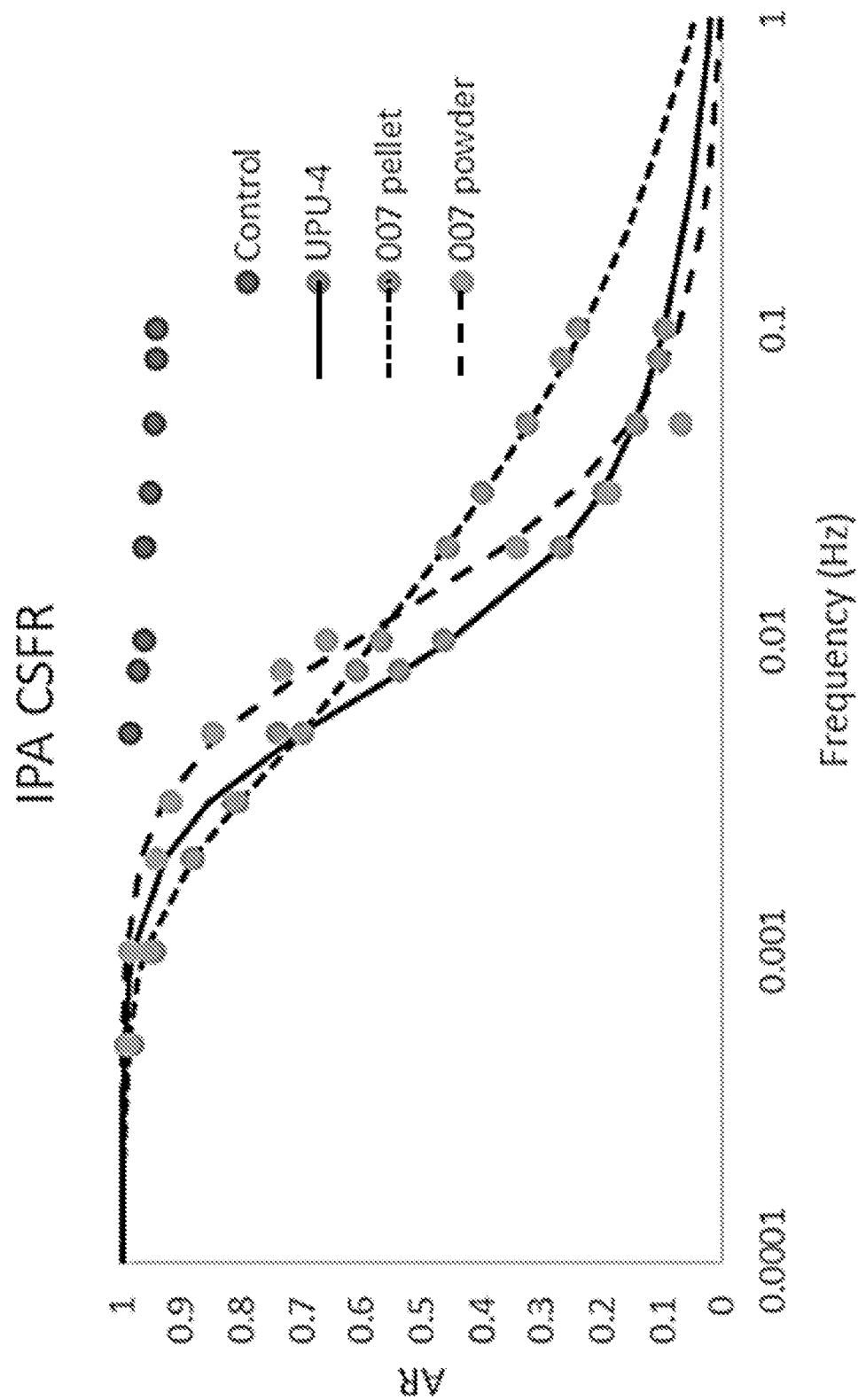

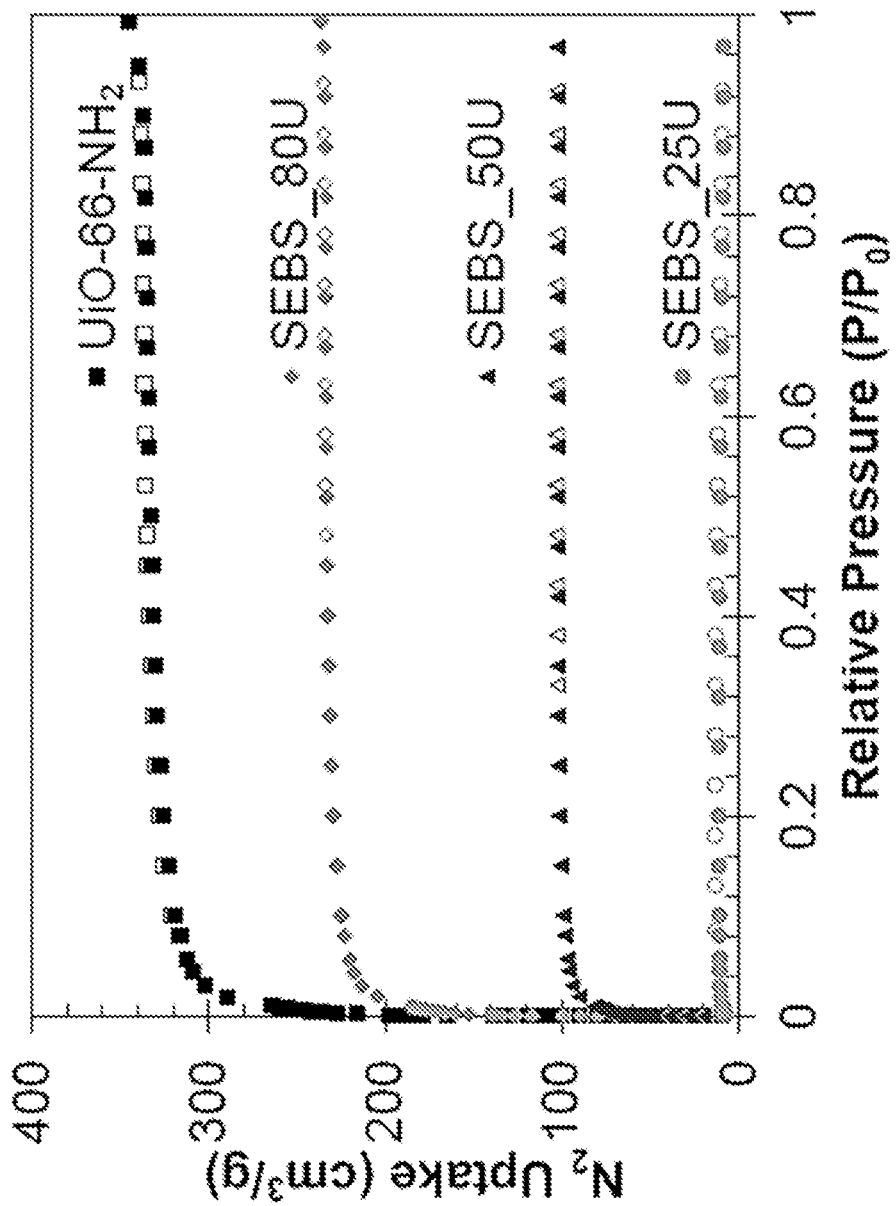

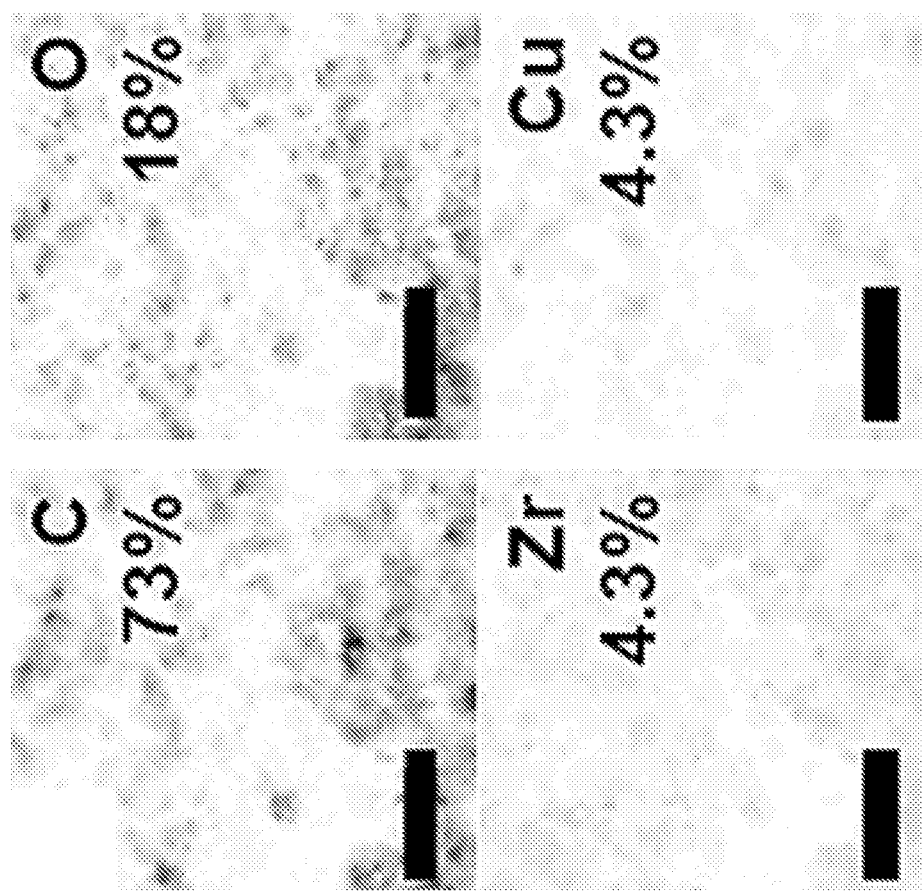

POLYMER-BASED COMPOSITE BEADS COMPRISED OF METAL-ORGANIC FRAMEWORKS AND METAL OXIDES FOR TOXIC CHEMICAL REMOVAL

CROSS REFERENCE TO RELATED APPLICATION

This application claims the benefit of U.S. Provisional Patent Application No. 63/079,218 filed on Sep. 16, 2020, the contents of which, in its entirety, is herein incorporated by reference.

GOVERNMENT INTEREST

The embodiments herein may be manufactured, used, and/or licensed by or for the United States Government without the payment of royalties thereon.

TECHNICAL FIELD

The embodiments herein generally relate to composite materials, and more particularly to composites containing active sorbent components.

DESCRIPTION OF THE RELATED ART

A chemical warfare agent (CWA) attack continues to be a latent threat to both military and civilian personnel. This has prompted the material science community to explore candidate nanomaterials that possess attributes of large sequestering capacities (high surface area) with a concurrent capability to detoxify CWA (high reactivity). Promising candidates such as metal oxides, metal organic frameworks and mixtures tend to be in powdered form and necessitates the need to process them into composites that are functional and robust for use in protective membrane barriers and garments. Polymeric binders are often employed in fabricating composite membranes, fibers, or beads. However, this strategy is accompanied by inherit trade-offs in weight composition and functionality: composites with a large percentage of active component tend to be brittle thereby eliminating their robustness, while those with low percentages leads to inhibition of the same attributes for which they were selected (i.e., porosity and reactivity). This dilemma of transitioning candidate materials to an applied form, such as incorporating a powdered catalyst into a composite that maintains its desired attributes, represents a technological gap in the material science industry. The inability to achieve this transition has therefore stifled advancements in protective garments that currently rely on high surface area yet non-reactive activated carbon, the technological origins of which dates to the First World War.

Due to the high toxicity of these chemicals, military, first responder, and even civilian personnel require protective ensembles for protection. Defense against CWAs is provided through a variety of personal protective equipment (PPE). Gas masks with filters containing activated carbon provide protection against high volatility and aerosolized chemicals that pose respiratory hazards. Percutaneous protection is provided by semi-permeable suits containing activated carbon spheres. While carbon spheres have high capacities for and excellent barrier properties against CWAs, there are also shortcomings associated with their use. For example, CWAs adsorb in high quantities within the porous network but do not sufficiently react; thus, CWAs may continue to diffuse through the fabric or pose a contact hazard due to lack of detoxification. Furthermore, carbon spheres layered between fabrics increase bulkiness and lead to increased physiological burden to the user, a shortcoming that has been addressed through the development and use of activated carbon fibers. Yet, these fibers generally lack the capacity of carbon spheres on a volume basis due to lower densities. Finally, hardened spheres are also prone to attrition and can break apart over time, reducing barrier effectiveness against CWAs.

CWAs and related toxic chemicals present a lethal threat upon exposure. These chemicals can be dispensed either through a gaseous, vapor or liquid form, and contaminate surfaces upon contact. Lethality can occur through different pathways and may include inhalation or being absorbed through the skin. These chemical warfare agents may include bis (2-chloroethyl)sulfide, also known as HD or mustard gas, which is a powerful vesicant chemical warfare agent (CWA) that causes large blisters on the exposed skin, eyes, and lungs. Pinacolyl methylphosphonofluoridate, which is also known as Soman or GD, and O-ethyl S-(2-diisopropylamino)ethyl methylphosphonothiolate, known as VX; are nerve agents that represents a class of organophosphorus compounds (OPs) that inhibit acetylcholinesterase (AChE). The inhibition of AChE causes neuromuscular paralysis, which if left untreated can lead to death within minutes of exposure. Despite its international ban, CWAs continue to be a deployed in combat areas and in terrorist attacks.

In addition to these chemical agents, simulants that are similar in molecular structure that are used for screening also pose a threat. One class of simulants may include (O,O-dimethyl)-(O-4-nitrophenyl)-phosphate (DMNP) or Diisopropyl fluorophosphate (DFP) for G-agents. Another class of simulants may include malathion or O,S-diethyl phenylphosphonothioate (DEPPT) for VX. Yet another class of simulants may include 2-chloroethylphenl sulfide (CEPS) and 2-chloroethylethyl sulfide (CEES), both simulants for HD. Toxic industrial chemicals (TIC) are an additional class of chemicals that pose a lethal threat. Examples of pesticides include parathion, paraoxon diazinon and malathion. Efforts are thus needed to provide protection for people who may come in contact with high risk areas where the chemicals have been exposed. In addition to military personnel, the use of functional protective clothing against toxic chemicals are recommended for first responders such as firefighters and police officers, researchers and scientists, and workers in the pesticide industry. As such, the development of protective clothing will require protection against a broad spectrum of chemicals.

Vapors of CWAs pose a life-terminal threat to anyone exposed, yet the mitigation of that threat through the use of protective yet breathable garments presents a severe engineering challenge. While past technologies have focused on impermeable membranes that prevent molecular diffusion from occurring in either direction, this is associated with a high level of discomfort and thermal burden originating from the wearer of the protective garment. In order to alleviate these issues, recent efforts have proposed the incorporation of reactive components into breathable membranes or fabrics that will not compromise protection. For instance, fabrics functionalized with reactive nanocomponents have been demonstrated by (i) dip coating pre-woven fabrics into a solution with the active catalyst or (ii) electrospinning the active catalyst directly with the polymer of interest into a mat. The former is a process-ready textile technology that can be immediately implemented at the level of industrial production. While the latter has seen great progress towards being developed for the industrial plant production. However, despite the advantages of each, the dip coating method still suffers from low catalyst weight loadings, while a commercial product arising from the method of electrospinning has yet to materialize.

Textiles capable of self-decontamination are therefore advantageous over textiles that can only capture and adsorb chemical threats. Efforts have been made to develop semi-permeable garments or membranes that are self-decontaminating but have non-zero moisture vapor transport rates. Methods to produce self-decontaminating fabrics include incorporating reactive sorbents such as metal oxides or metal-organic-frameworks (MOFs) for the decontamination of CWA into fabrics.

Current protective clothing relies on the use of high surface area carbon-based technology that is capable of adsorbing agents. The mechanism of protection relies on the ability of activated carbon that has been impregnated with metals, to absorb the chemicals, but lacks the ability to sufficiently decontaminate the chemical threat. While carbon-based protective clothing technology presents the advantage of acting as an impermeable barrier for the permeation of chemicals, it also presents the disadvantage of acting as a barrier to water transport arising from the perspiration of the wearer, thus negating the natural evaporative cooling mechanism of the human body. This leads to raised body temperatures which makes it uncomfortable to the wearer. Furthermore, when the carbon itself becomes contaminated, care is needed to remove the protective garment, or wash with decontamination solutions prior to removal. This is because the carbon can become saturated with agent, which then poses the risk of the agent leaching out of the carbon.

Through judicious choice of metal-secondary building unit connectivity, linker size and functionality, defect type and quantity, and additives, fast and efficient reactivity towards CWAs can be achieved. Most efforts to date have investigated reactivity of MOFs in powder form; however, for practical integration into PPE, shaped/engineered composites must be employed such that sufficient air permeation through the textile is achieved.

Within the past decade, a variety of strategies have been used to fabricate functional MOF substrates, the most facile of which is direct pressurization of powder into pellets. Although pressurization is successful in some cases, increased hardness generally requires increased pressure, which can degrade porosity and surface area. Furthermore, pressed pellets require specialized equipment to create spherical particles. Inorganic binders, such as alumina, require high calcination temperatures, and preformed beads must be used to grow MOFs in situ, reducing the total amount of MOF on a weight basis. MOFs also have been shaped using polymer binders including cellulose, poly (vinyl alcohol), poly(ethylene glycol) (PEG), and poly(m-ethyl methacrylate) (PMMA). Yet, most of these binders significantly reduce porosity and diffusion due to polymer chains restricting access to the MOF pores. Furthermore, these previous efforts have used high-boiling-point solvents that are often difficult to remove from the final composite.

SUMMARY

In view of the foregoing, an embodiment herein provides a polymer-based material comprising a polymeric binder; and one or more porous active materials that adsorb, chemisorb, decompose, or a combination thereof, a hazardous chemical. The polymeric binder and the one or more porous active materials are combined to form a composite bead. The polymeric binder may comprise a polyurethane or a styrene-based block copolymer. In examples, the one or more porous active materials may comprise any of MOFs, metal oxides, Zr-based MOFs, specifically UiO-66, UiO-67, UiO-66-NH2, MOF-808, NU-1000, MOF-525, etc., HKUST-1, MOF-74, MIL MOFs, Zeolite imidazolate frameworks, Multivariate MOFs, Zirconium oxyhydroxide $(Zr(OH)_4)$, Titania, Zeolites, and activated carbon, among others. The one or more porous active materials may be between 1 and 99 wt % of a total composite mass of the composite bead. The one or more porous active materials may be between 80 and 95 wt % of a total composite mass of the composite bead. The hazardous chemical may comprise a chemical warfare agent and a simulant of chemical warfare agents. The composite bead may comprise a chemical treatment material that performs oxidation on the hazardous chemical. In an example, the chemical treatment material may comprise MOF-525. The composite bead may comprise a chemical treatment material that performs hydrolysis on the hazardous chemical. In some examples, the chemical treatment material may comprise any of MOFs, metal oxide, Zr-based MOFs, and $Zr(OH)_4$. The one or more porous active materials may comprise any of metal oxides, metal hydroxides, metal hydrates and metal organic frameworks, cations or anions, chemical substitutions with chemical elements or mixtures thereof.

In some examples, the chemical elements or mixtures thereof may comprise any of iron (I, II, III, and/or IV) salts (chloride, sulfide, nitrate), iron (I, II, III, and/or IV) hydroxide, lanthanide oxides, lanthanide iron oxides, manganese (II, III, and/or IV) oxide, manganese tetraoxide, manganese (II, III, and/or IV) salts (chloride, sulfide, nitrate), cobalt (II, III) oxide, cobalt salts (chloride, sulfide, nitrate), nickel (II or III) oxide, copper (I or II) oxide, copper (II) hydroxide, copper (II) salts (chloride, sulfide, nitrate), and other metal salts, cerium, hafnium, titanium, aluminum, benzenedicarboxylic acid, aminoterephthalic acid, and benzenetricarboxylic acid. The hazardous chemical may comprise a chemical warfare agent comprising G, V, and H class agents. The hazardous chemical may comprise any of sulfur mustard (HD), VX, tabun (GA), sarin (GB), soman (GD). The hazardous chemical may comprise a simulant comprising any of 2-chloroethyl ethyl sulfide (2-CEES), dimethyl methylphosphonate (DMMP), dimethyl chlorophosphate (DMCP), diisopropyl methylphosphonate (DIMP), methyl dichlorophosphate (MDCP), and difluorphosphate (DFP). The hazardous chemical may comprise any of an acidic and acid-forming chemical and a basic and base-forming chemical.

The hazardous chemical may comprise any of ammonia, hydrogen chloride, sulfur dioxide, hydrogen sulfide, and cyanogen chloride. The composite bead may be configured to be incorporated into a garment. The composite bead may be configured to be incorporated into a filter. The composite bead may be configured to be incorporated into a film, wipe, fiber, or polymer. The filter may provide an end-of-service life indicator that interacts with the hazardous chemical. The composite bead may provide a residual life indicator showing interaction of the composite bead with the hazardous chemical. The polymeric binder may comprise a single component polymer or a blend of multiple polymers.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1A is a scanning electron microscope image of a single composite bead with a scale of the bar at 300 μm, according to an embodiment herein;

FIG. 1B is a scanning electron microscope image of a hierarchical pore structure of a composite bead with a scale of the bar at 10 μm, according to an embodiment herein;

FIG. 1C are schematic diagrams illustrating alternative configurations for composite beads, according to the embodiments herein;

FIG. 5 is a graph illustrating the diffusion of isopropyl alcohol (IPA) through a polyurethane UiO-66-$NH_2$ composite bead (labeled as UPU-4), and corresponding native powder of UiO-66-$NH_2$ and pellet made from the powder, according to an embodiment herein;

FIG. 15A is a graph illustrating $N_2$ data for composite beads made from G1642 SEBS with different MOF loadings, with the adsorption depicted by filled data points, and desorption depicted by unfilled data points, according to an embodiment herein;

FIG. 17C are energy-dispersive (EDS) X-ray spectroscopy maps of major constituents within SEBS_80U/H in atomic percent, with a scale of the bar at 30 μm, according to an embodiment herein;

DETAILED DESCRIPTION

Figure 2A:
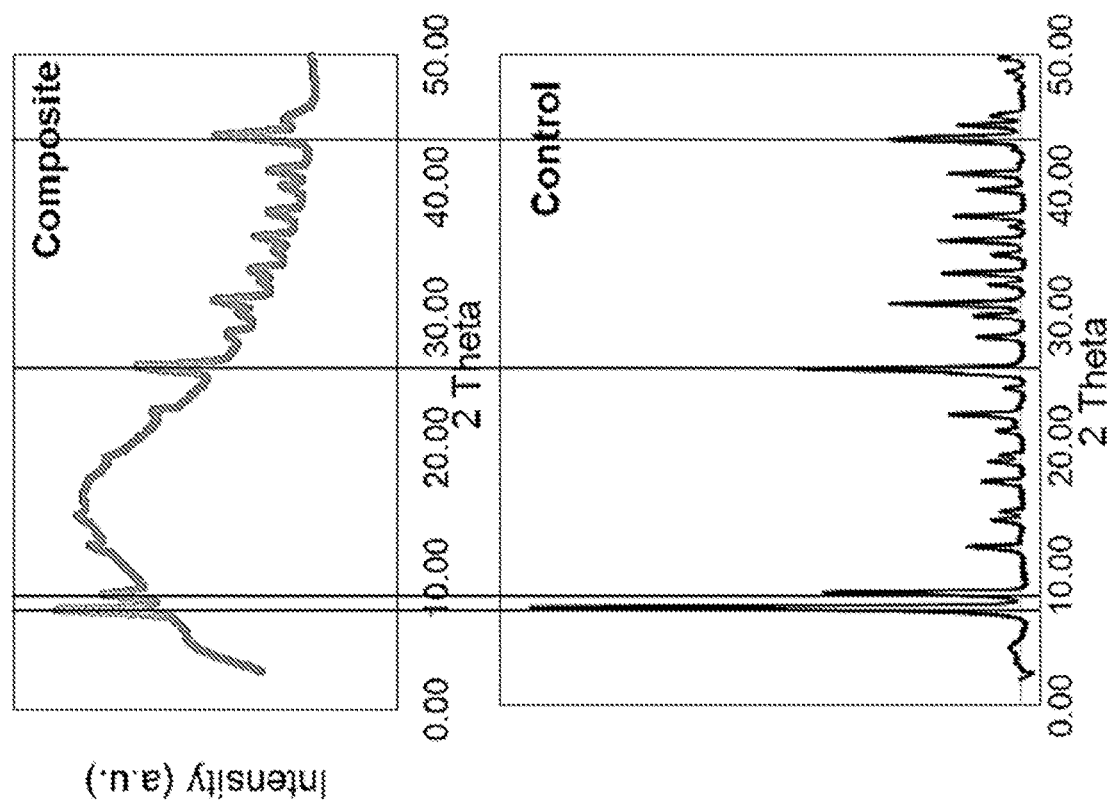
FIG. 2A are X-Ray diffraction (XRD) plots of the composite bead provided by the embodiments herein compared to a conventional control material.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein address the shortcomings associated with both activated carbon and previously investigated binders by developing reactive MOF composite beads using phase-inverted poly(styrene-block-ethylene-ran-butylene-block-styrene) (SEBS). Whereas PEG was shown to penetrate into the MOF crystal structure, thereby reducing access to the pores, the embodiments herein indicate that the bulkier polystyrene (PS) groups of SEBS would prevent such infiltration, while retaining an elastomeric framework. Phase inversion, a well-known technique typically used to fabricate membranes, is a process in which a polymer solution is exposed to a non-solvent such that the polymer coagulates into a solid form. The choices of solvent and non-solvent can result in various morphologies due to a balance of thermodynamic and kinetic effects. SEBS is a block copolymer that terminates in polystyrene blocks. The large pendent groups of polystyrene keep the polymer chains from penetrating into the pores of the MOF. Referring now to the drawings, and more particularly to FIGS. 1A through 18, where similar reference characters denote corresponding features consistently throughout the figures, there are shown preferred embodiments. In the drawings, the size and relative sizes of components, layers, and regions, etc. may be exaggerated for clarity.

The embodiments herein utilize MOF UiO-66-NH$_2$ into SEBS to form elastomeric beads in a "bend-but-not-break" strategy. The Zr-based UiO-66-NH$_2$ is selected because it reacts efficiently with CWAs and is scalable in quantities large enough to integrate into protective suits. Spherical particles with diameters as low as ~300 μm, smaller than previously reported beads, have been experimentally fabricated using easy-to-activate solvents. These composites demonstrate better protective barrier performance and higher CWA removal capacities, along with greater reactivities when compared to activated carbon fabrics. Furthermore, the elastomeric properties of the composite reduced particle attrition by ~80% vs. attrition from particles formed from other techniques like pelletization. The resulting phase-inverted constructs also contains macroporous voids resulting in a hierarchical porous network with faster diffusion rates when benchmarked against other particle systems. Finally, the framework of MOF-polymer composite beads has been expanded to systems comprising multiple MOFs, which demonstrate enhanced and broadened protection relative to the comparable pure MOF powders.

The composite beads provided by the embodiments herein contain either single or multicomponent reactive species that have been identified as excellent candidates for the degradation of CWA. In one embodiment, the reactive component can comprise metal oxides such as Zr(OH)$_4$ known to instantaneously degrade the nerve agent VX, and several metal organic frameworks UiO-66, UiO-66-NH$_2$, or HKUST known to be reactive against chlorine and ammonia, among others. The composite beads are characterized for their morphology, ability to protect against CWA, and they can be included in different architectures such as a separate layer on woven or non-woven textile with an adhesive. These textiles comprised of the composite beads can be used to produce fabric capable of adsorbing and reacting with hazardous chemicals. Higher MOF content leads to better performance, and weight loadings as high as 95% are demonstrated, which leads to robust composite beads without sacrificing access to the porosity and by extension the reactive sites. Furthermore, the embodiments herein provide that the beads can be produced in a variety of manner including an automated process that takes advantage of the interfacial properties of the coagulant bath and droplet size, for the continuous production of kilogram batches. These batches comprise near-unimodal bead diameter on the size of a few hundred microns. The reduced bead size leads to better chlorine gas breakthrough capacities, diffusion transport and when incorporated into a swatch better permeation performance. Collectively these results form the foundation towards the development of next generation CB protective garments.

The embodiments herein utilize a phase inversion method to fabricate highly reactive composite beads. Polyurethane (PU) and poly(styrene-block-ethylene-ran-butylene-Nockstyrene), SEBS, are selected to immobilize the MOF UiO-66-NH$_2$ and HKUST-1 into flexible polymeric beads, as well as zirconium hydroxide (Zr(OH)$_4$), respectively. The choice of polyurethane is influenced by its wide use in commercial applications, and most importantly its usage in filtration technology owing to its high chemical resistance. The composites beads provided by the embodiments herein circumvent the use of both high pressure and temperature by starting with a solution of all the components and pipetting it into a coagulant bath. In one embodiment, PU is dissolved in THF after which UiO-66-NH$_2$ is added while the mixture is heated within the range of 25-150° C., but preferably within the range of 40-80° C. Once all the components are thoroughly mixed, the entire volume is reduced to 10%-80% of the original volume, and preferably to 40-60% of the original volume. Using a variety of composition mixtures, methods to dispense and coagulation solution, composite beads are attained within the range of 200 microns to 5000 microns, but preferably in the range of 400-600 microns. In one embodiment a polyurethane UiO-66-NH$_2$ composite solution is delivered by a syringe with a 21 gauge needle and pipetted drop-by-drop into an ethanol/deionized water bath producing composite beads between 1-2 mm. The beads may be extracted from the bath and allowed to dry for some duration of time, from 1-48 hours, but preferably 12-24 hours. Initial characterization of the composite bead demonstrates their ability to survive the processing step and nitrogen adsorption measurements show that the composite is highly porous. Beads are produced with different weight percentages, ranging from 20-95 MOF wt %. While it is to be expected that higher weight loadings would exhibit greater surface area, the relationship between total surface area and MOF loading is not linear, indicating that at lower MOF loadings pores are blocked. In one embodiment, a MOF loading of 90 wt % results in composite beads that have a surface area value of 1050 m$^2$/g. When compared to the native powder which has a surface area value of 1350 m$^2$/g, the composite bead to native powder surface area ratio stands at 85/100. These results indicate that when UiO66-NH$_2$ is present at these high loadings, all the pores are accessible. In contrast, when the MOF is present at lower loadings the polymer can block pores limiting accessibility.

Solvent studies are experimentally performed to optimize the coagulant bath using a binary solution mixture of solvents (deionized water, ethanol, 2-propanol, methanol, isopropanol) at varying ratios (0:100%, 25:75%, 50:50%, 75:25% and 100:0%). In one embodiment a 75% ethanol to 25% deionized water binary solution mixture is used for producing robust spherical beads. Traditionally, protective garments containing activated carbon beads required that they be engineered in sub-millimeter sized beads that can be attached to garments with an adhesion layer. Engineering activated carbon in this form presents the manufacturing disadvantage that large scale production of activated carbon beads requires high temperatures making it an energetically and costly endeavor. However, since the droplet size is partially determined by gravimetric forces, once a critical droplet size is reached, the composite droplet will break from the syringe and fall into the coagulation bath. In order to obtain sub-millimeter sized beads, the embodiments herein utilize the interfacial properties of the coagulant bath and composite solution. It is discovered that if the composite droplet is first partially immersed at the coagulant interface and then pulled away, the forces of the liquid surface tension is enough to reduce the critical size of the droplet.

The composite beads produced in accordance with the techniques described above with polyurethane and UiO-66-NH$_2$ in a coagulation solution (75% ethanol, 25% deionized water) may be generally spherical. As shown in FIG. 1A, a SEM image of a single bead, scale bar 300 µm, is shown along with the hierarchical pore structure of the composite bead, as shown in FIG. 1B, due to the semi-impermeable nature of the polymer to the coagulant bath. FIG. 1C shows other configurations that could arise for the composite beads such as a core-shell structure that inhibits access to the MOF particles and thus its pores, a pomegranate structure that has MOF particles on the surface, and MOF particles bound by a polymer, with all porosity accessible.

The ability to mass-produce robust beads with enhanced protective capabilities is critical. Several groups have investigated automated processes to fabricate composite beads, but these methods typically produce multimodal sized beads that need to later be sieved. By taking advantage of the interfacial properties of both the composite droplet and the coagulant bath to produce sub-millimeter size beads, a test apparatus is provided to automate the process. In an example, a linear actuator driver is programmed to automatically raise and lower the coagulant bath to the tip of the syringe needle, while the composite droplet is controlled by a syringe pump. By partially immersing the droplet at the interface and extracting downward, the additional interfacial forces reduce the critical droplet size by an order of magnitude. In this manner, near-unimodal sized beads within the range of 200-800 microns and more preferably averaging 400 microns in size are obtained. Through automation batch quantities of several to tens of grams of unimodal sized composite beads may be produced.

Figure 2B:
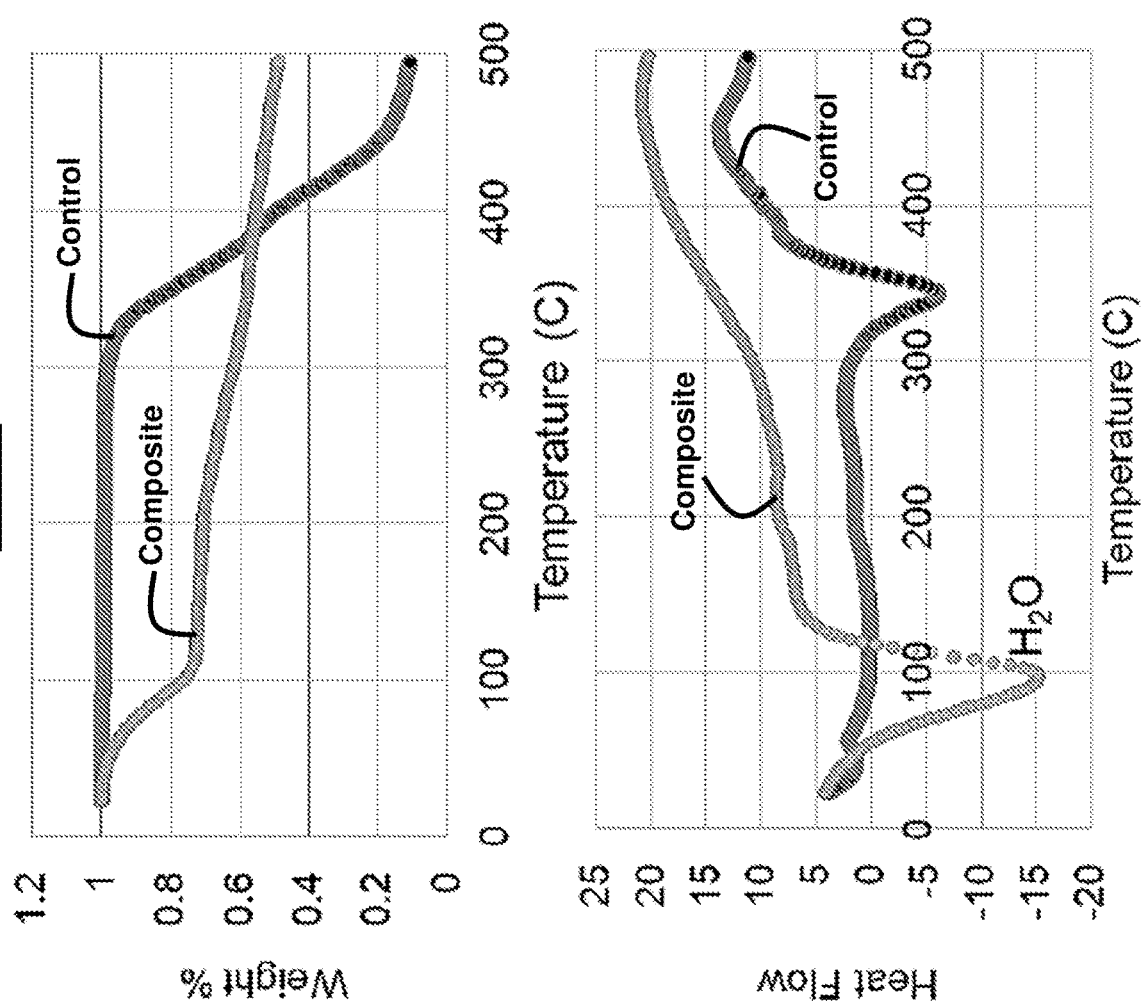
FIG. 2B are dynamic scanning calorimetry plots of the composite bead provided by the embodiments herein compared to a conventional control material.

Powder x-ray diffraction (XRD) may be performed to confirm the presence of the UiO-66-NH$_2$ and to ensure that the coagulation process does not result in MOF degradation. As can be seen in FIGS. 2A and 2B, the XRD pattern of the composite material is compared against the native powder, demonstrating that all the primary peaks are present in the bead. Broadening of the pattern is observed, which is to be expected with polymeric systems. Dynamic scanning calorimetry may be performed for both the composite bead and native powder. FIG. 2A shows the XRD of the composite bead (top) and the native catalyst UiO-66-NH$_2$ (bottom) are shown. Lines serve as a guide to the eye for matching the XRD peaks in each. FIG. 2B shows the Dynamic Scanning calorimetry of the composite bead x and native catalyst UiO-66-NH$_2$ y.

Figure 3:
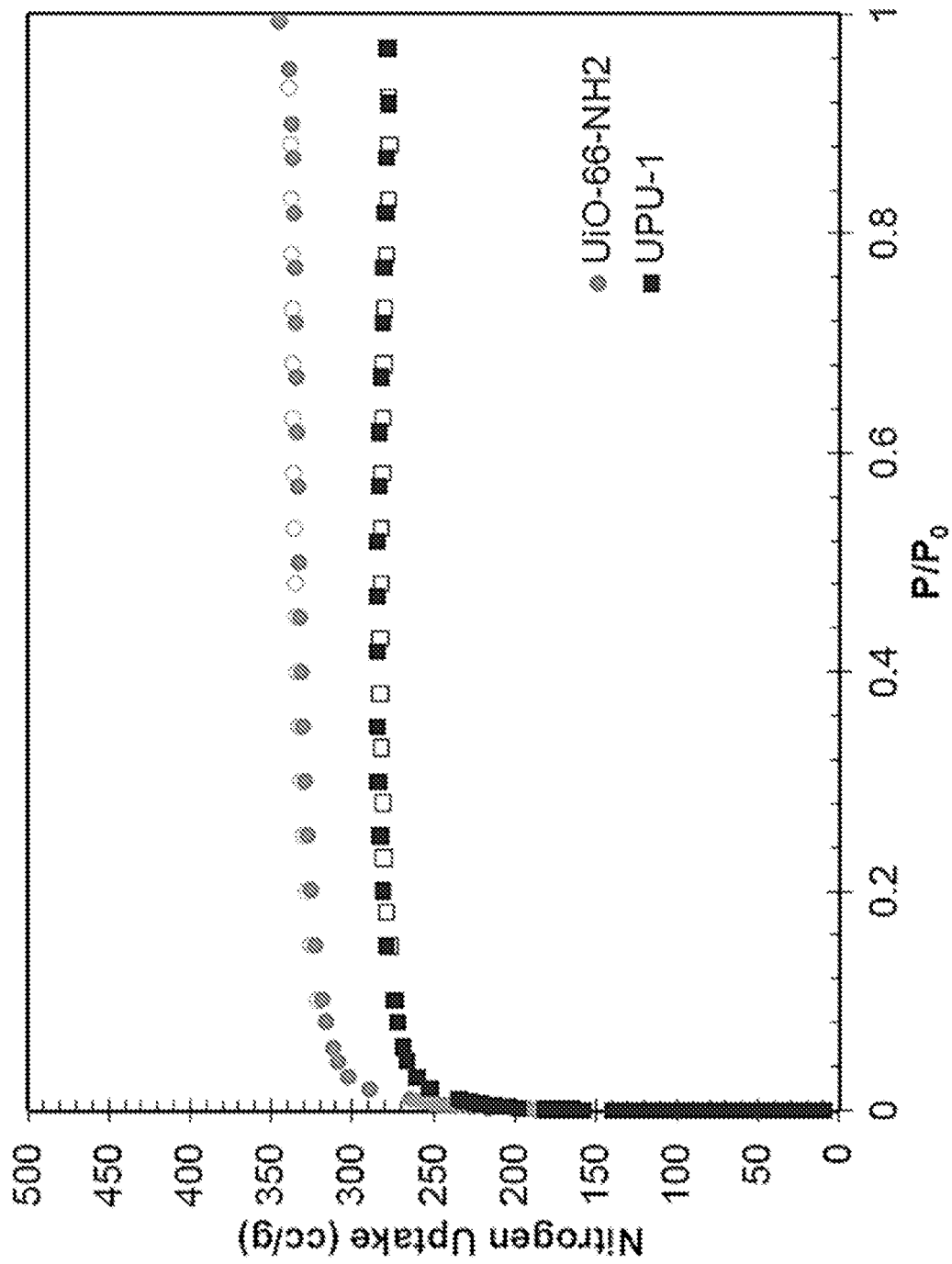
FIG. 3 is a nitrogen ($N_2$) isotherm of the composite bead (UPU-1) provided by the embodiments herein compared to a conventional control material (UiO66-$NH_2$)

FIG. 3 is a graph of the nitrogen uptake. Nitrogen isotherms are shown of the native powder (UiO66-NH$_2$) and compared with the composite bead (UPU-1). Both isotherms exhibit a sharp step with no hysteresis indicating the presence of mircopores and the absence of mesopores. It is expected that there would be a reduction in the total gravimetric surface area with the inclusion of the polymeric binder. However, it is discovered that there is no synergistic reduction with the inclusion of the polymer implying that the presence of the polymer does not block any of the pores. The total gravimetric surface area accounts for 85% of the surface area of the native powder, indicating that the polymeric binder does not inhibit access to the pores and all the pores are accessible.

Figure 4A:
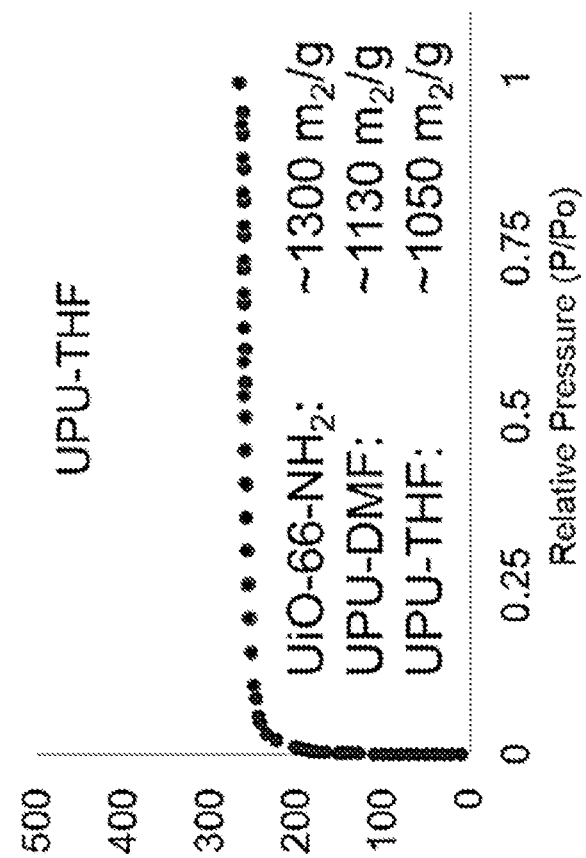
FIG. 4A is a $N_2$ adsorption isotherm for UPU prepared in the solvent dimethylformamide (DMF), according to an embodiment herein.
Figure 4B:
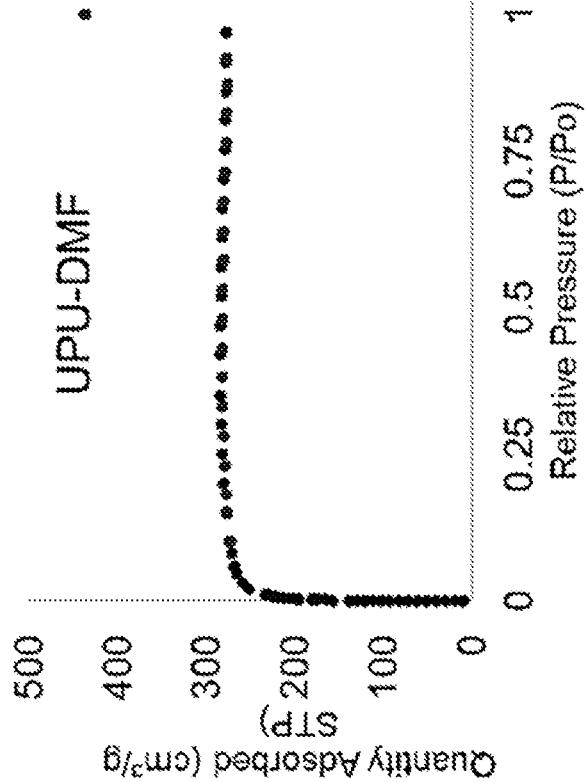
FIG. 4B is a $N_2$ adsorption isotherm for UPU prepared in the solvent tetrahydrofuran (THF), according to an embodiment herein.
Figure 6A:
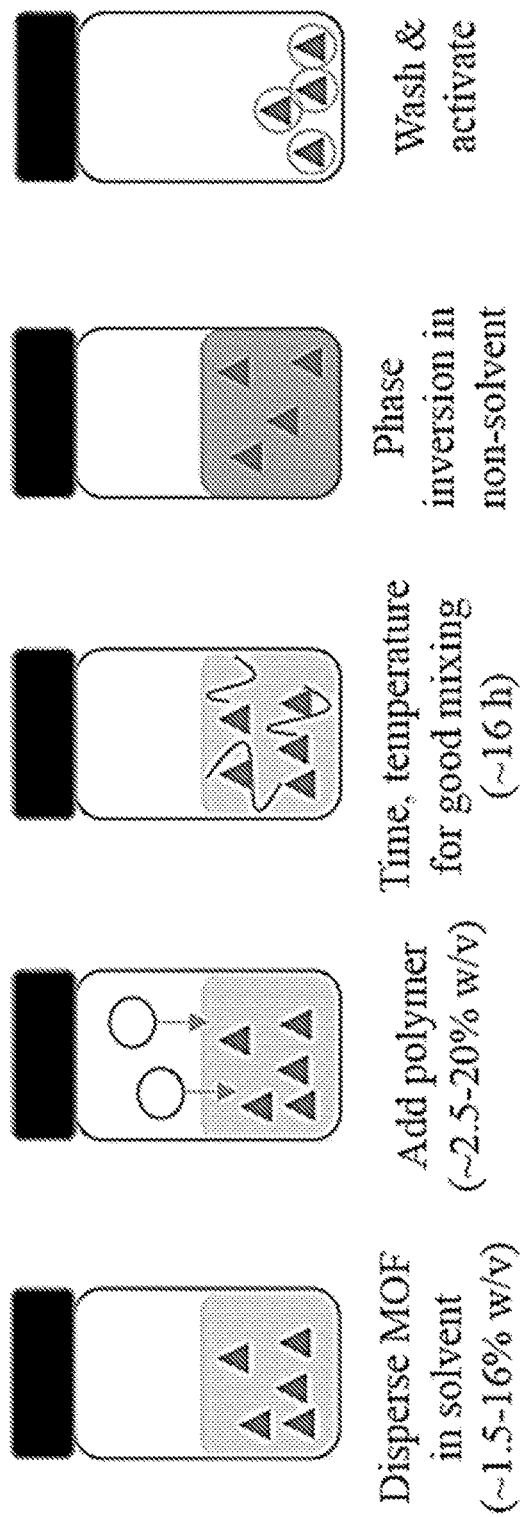
FIG. 6A are schematic diagrams illustrating phase inversion processing steps for MOF-polymer composites, with the percentages given with respect to the solvent volume, according to an embodiment herein.
Figure 6C:
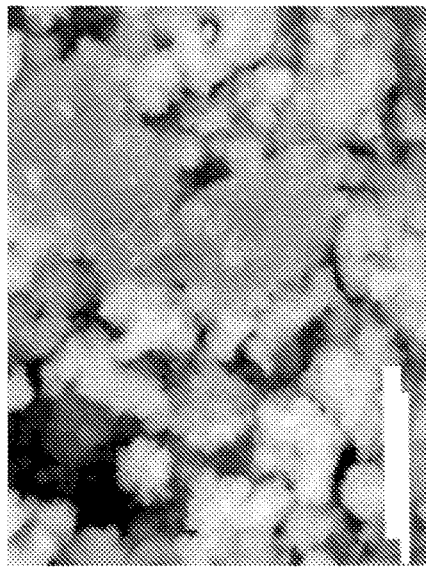
FIG. 6C is a SEM image of SEBS_80U, with a scale of the bar at 8 μm, according to an embodiment herein.
Figure 6B:
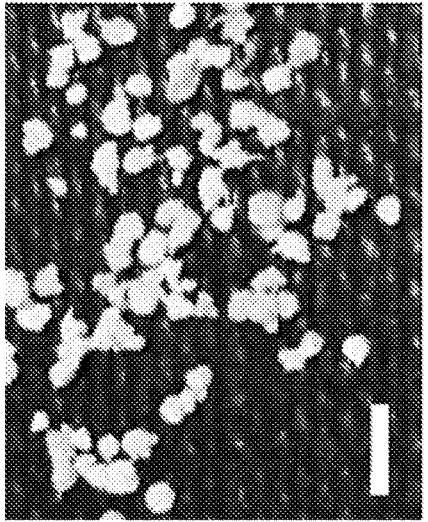
FIG. 6B is an image of beads resulting from a phase inversion and drying process, with a scale of the bar at 2 mm, according to an embodiment herein.
Figure 7B:
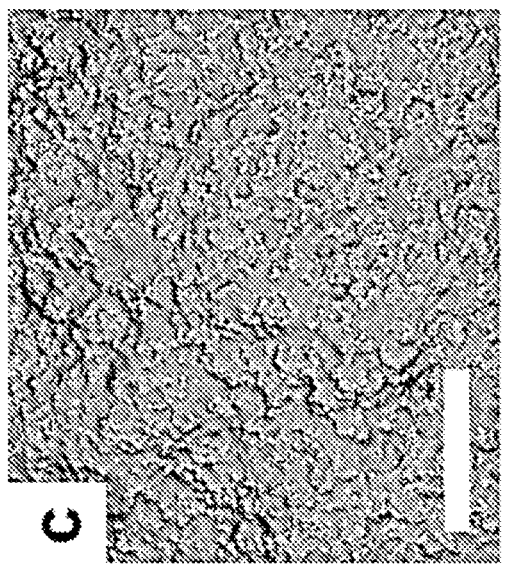
FIG. 7B is an optical image of dried SEBS_80U film, with a scale of the bar at 1 cm, according to an embodiment herein.
Figure 7C:
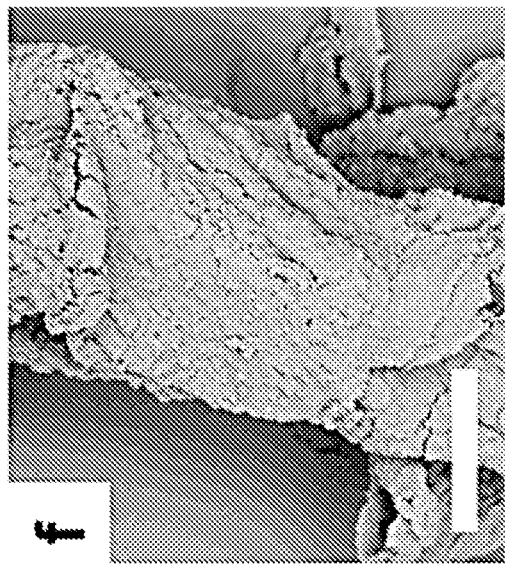
FIG. 7C is a SEM image of dried SEBS_80U film, with a scale of the bar at 80 μm, according to an embodiment herein.
Figure 7A:
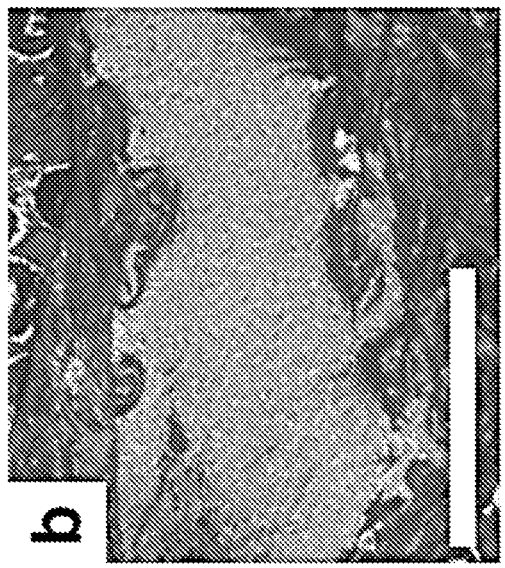
FIG. 7A is an optical image of SEBS_80U floating on water, with a scale of the bar at 1 cm, according to an embodiment herein.
Figure 7E:
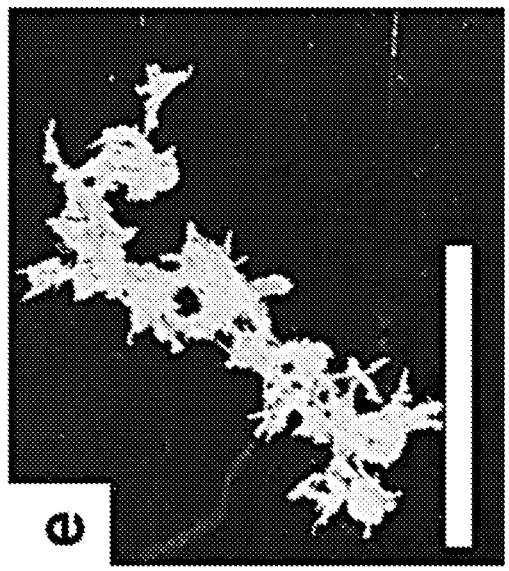
FIG. 7E is an optical image of dried fiber-like SEBS_80U composites, with a scale of the bar at 1 cm, according to an embodiment herein.
Figure 7F:
FIG. 7F is a SEM image of dried fiber-like SEBS_80U composites, with a scale of the bar at 80 μm, according to an embodiment herein.
Figure 7D:
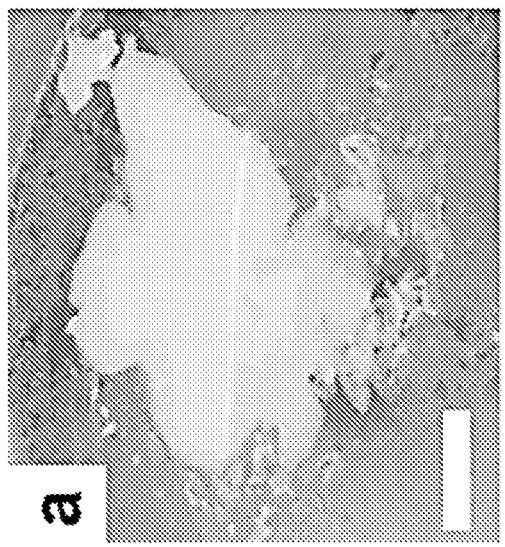
FIG. 7D is an optical image of SEBS_80U fiber-like coagulated composites at the bottom of a beaker containing ethanol, with a scale of the bar at 1 cm, according to an embodiment herein.

FIGS. 4A and 4B are graphs of N$_2$ adsorption isotherms for UPU prepared in the solvent DMF, as shown in FIG. 4A, and UPU prepared in the solvent THE, as shown in FIG. 4B. The graph inset indicates the surface area of the two types of composite beads with the native catalyst UiO-66-NH$_2$. In an example, the beads may be between 300-400 µm.

Table 1 provides loadings and reactivity of a polyurethane UiO-66-NH$_2$ composite bead (labeled as UPU-1) compared to native the UiO-66-NH$_2$ powder.

TABLE 1

| Sample | Cl₂ Loading (mol/kg) Dry | 2-CEES Loading (mol/kg) Dry | 2-CEES Loading (mol/kg) Wet | % Removed @ 24 h GD | % Removed @ 24 h HD | % Removed @ 24 h VX |
|---|---|---|---|---|---|---|
| UiO-66-NH$_2$ | 10.9 | 7.8 | 4.8 | 85 | 100 | 85 |
| UPU-1 | 5.3 | 6.3 | 2.3 | 94 | 77 | 62 |

The material was slightly more reactive against GD and slightly less reactive against HD and VX. These data show that this approach is viable and can be optimized for performance. The composite bead was experimentally evaluated for agent reactivity as well as probed with chlorine and 2-CEES using microbreakthrough techniques. The smaller particles translate to a 3-fold enhancement in the breakthrough capacity. It is suggested that this is due to the increase in the mean free path of the diffusing vapor. In order to confirm this, concentration swing frequency response measurements are performed.

FIG. 5 is a graph illustrating the diffusion of IPA through a polyurethane UiO-66-NH$_2$ composite bead (labeled as UPU-4), and corresponding native powder of UiO-66-NH$_2$ and pellet made from the powder. The graph shows the diffusion studies performed on the polyurethane and UiO-66-NH$_2$ composite beads and compared to the native UiO-66-NH$_2$ powder and pellets made from UiO-66-NH$_2$ powder. As expected, both the polymer beads and pelletized MOF show more mass transfer resistance than powder. Despite being larger, the polyurethane and UiO-66-NH$_2$ composite beads shows faster uptake than a pressed pellet of UiO-66-NH$_2$.

Table 2 provides the diffusion values for a polyurethane UiO-66-NH$_2$ composite bead (labeled as UPU-4), and corresponding UiO-66-NH$_2$ powder and pellet made from the powder.

TABLE 2

| Sample | Bt capacity (mol/kg) | K (mol/kg bar) | D/r² (1/s) | R$_{eff}$ (mm) | D$_{eff}$ (m²/s) |
|---|---|---|---|---|---|
| UPU-4 | 4.54 | 23.2 | 0.003590 | 1.4 | 7 × 10⁻⁷ |
| Pellet | 4.96 | 21.6 | 0.000412 | 1.2 | 5.9 × 10⁻⁸ |
| Powder | 5.69 | 16 | N/A | N/A | N/A |

Experiment

The specific parameters, values, amounts, ranges, materials, types, brands, etc. described below are approximates and were merely selected for the experiments, and as such the embodiments herein are not limited to the specific descriptions below.

Composite Bead Fabrication and Permeation Behavior

Initial investigations to tune composite bead size using phase inversion were conducted by varying SEBS content in tetrahydrofuran (THF)-based solutions dropped into an ethanol/water (75/25 v/v) non-solvent bath. It was determined that SEBS contents between 2.5-5 wt % and a smaller needle opening (30 gauge in comparison to 25 gauge) reduced bead diameter from ~2 mm to ~300 MOF beads containing 80 wt % UiO-66-NH$_2$ (note: nomenclature is SEBS_80U, in which 80 stands for wt % and U stands for UiO-66-NH$_2$) then were fabricated using the process shown in FIG. 6A and resulted in spherical beads shown in FIG. 6B with macroporosity shown in FIG. 6C. The process was found to be highly tunable to facilitate manipulation of composite morphology, bead size, and bead content by varying parameters such as the solvent and non-solvent used, the type and content of polymer, and the type and amount of MOF. For example, pure water and ethanol were considered for non-solvents; however, thin films were formed in water at the air interface, whereas string-like morphologies were produced in ethanol as shown in FIGS. 7A-7F. Mixtures of ethanol and water created spherical beads because of the combined lower density and lower surface tension of the ethanol/water mixture relative to pure water. Various solvents also were investigated, and THF was chosen over dimethylformamide, as the former was easier to remove from the Zr-based MOF due to its greater volatility. Interestingly, phase inversions from dichloromethane formed perfectly spherical beads in solution; however, during the drying process the composites fell apart due to the lack of solvent exchange. A more detailed discussion on solubility parameter analysis and solvent exchange is provided below with respect to the Hansen Solubility Parameter Analysis. In short, bead formation from THF into ethanol/water mixtures was found to be ideal for the applications herein.

Figure 8:
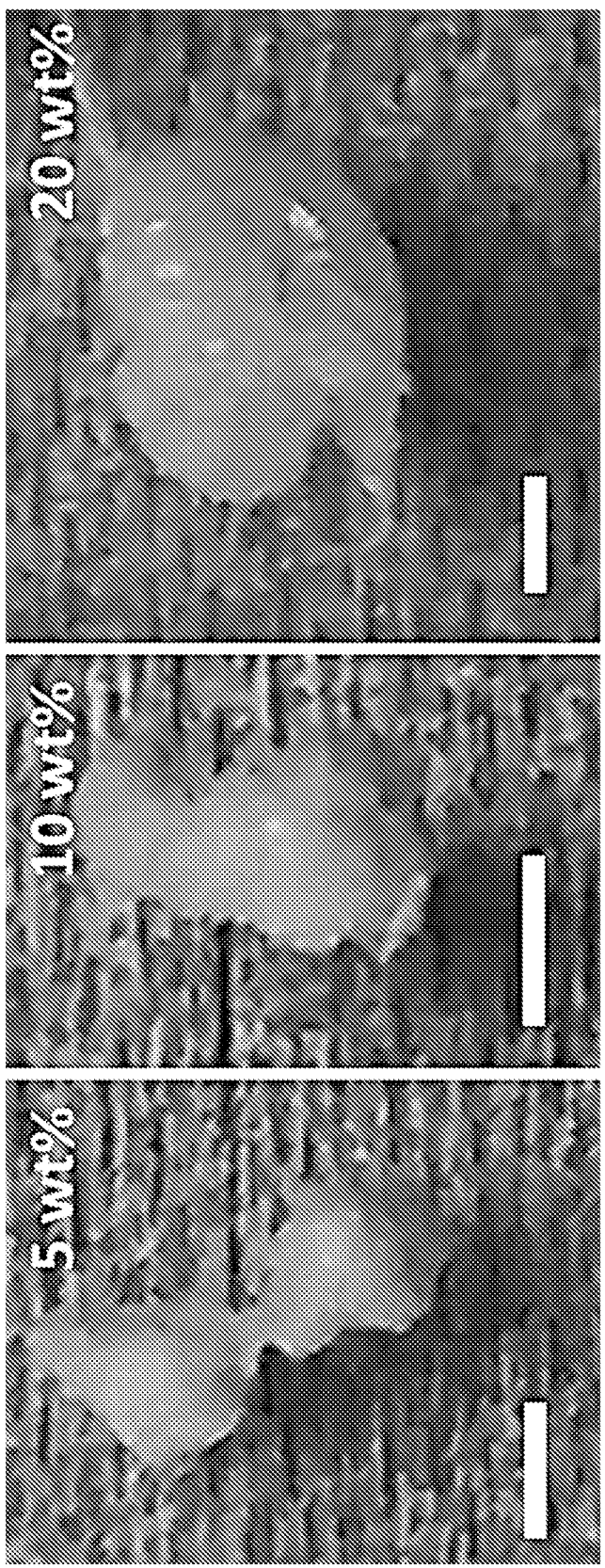
FIG. 8 are images illustrating the bead size as a function of polymer concentration in solvent prior to phase inversion, with a scale of the bar at 1 mm, for 5 wt %, 10 wt %, and 20 wt % samples, and with the 5 wt % sample illustrating two particles, according to an embodiment herein.
Figure 9A:
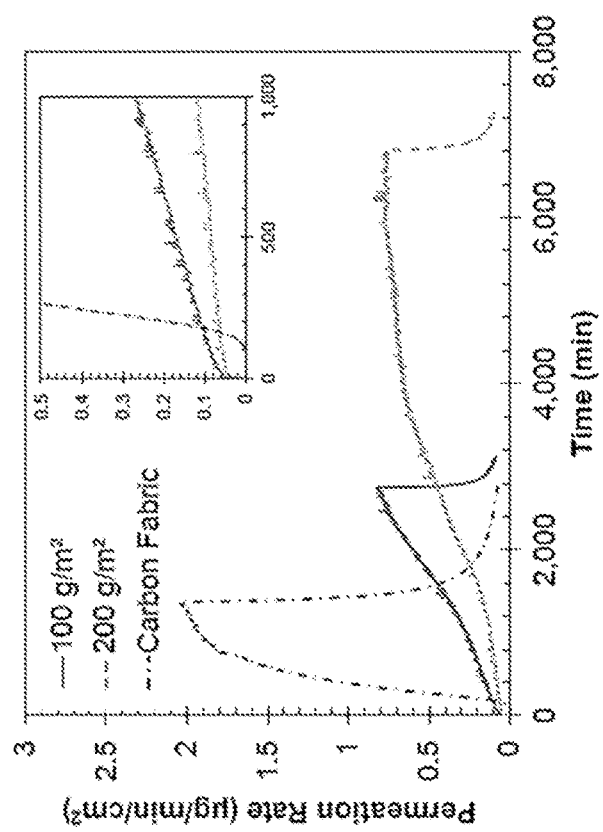
FIG. 9A is a graph illustrating 2-chloroethyl ethyl sulfide (CEES) permeation of textile loaded with 100 and 200 $g/m^2$ of composite beads made with G1642 SEBS in comparison to carbon fabric, with early-time permeation results shown in the graph inset, according to an embodiment herein.
Figure 9B:
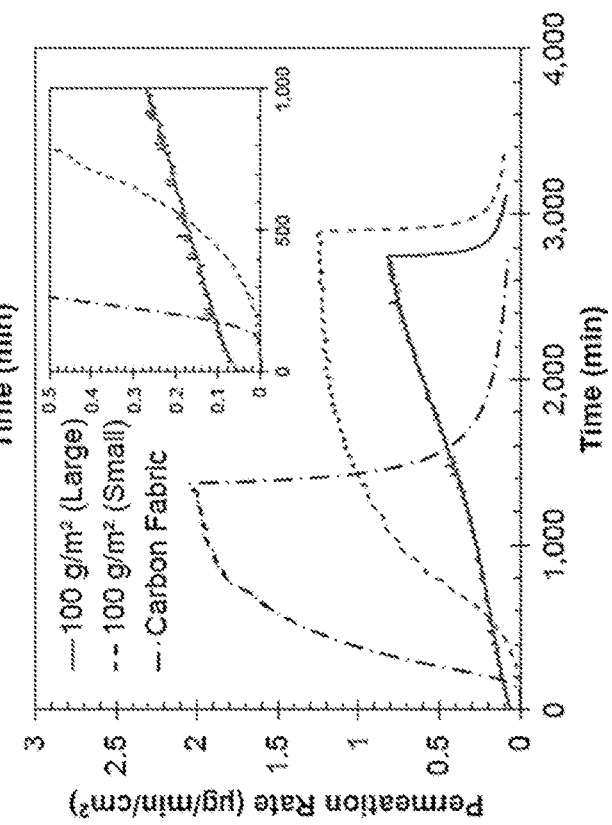
FIG. 9B is a graph illustrating 2-chloroethyl ethyl sulfide (CEES) permeation of textile loaded with large and small beads at 100 $g/m^2$ of composite beads, with early-time permeation results shown in the graph inset, according to an embodiment herein.
Figure 10A:
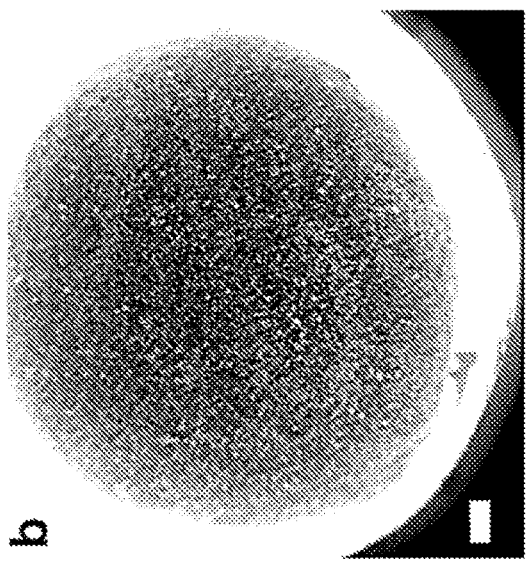
FIG. 10A is an optical image of a textile swatch made from large composite beads, with a scale of the bar at 1 cm, according to an embodiment herein.
Figure 10B:
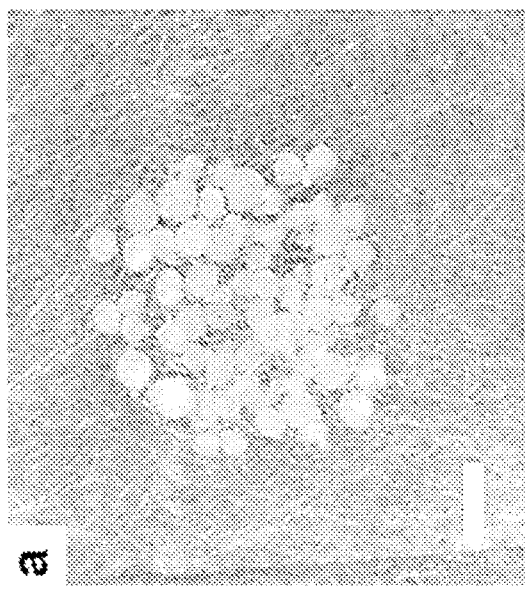
FIG. 10B is a SEM image of a large composite bead, with a scale of the bar at 100 μm, according to an embodiment herein.
Figure 10C:
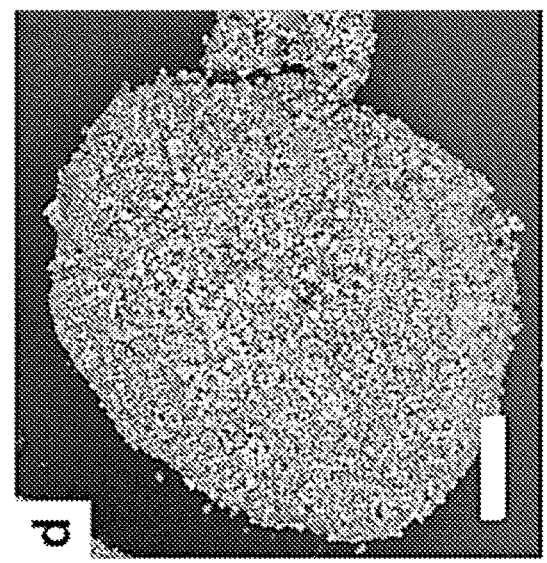
FIG. 10C is an optical image of a textile swatch made from small composite beads, with a scale of the bar at 1 cm, according to an embodiment herein.
Figure 10D:
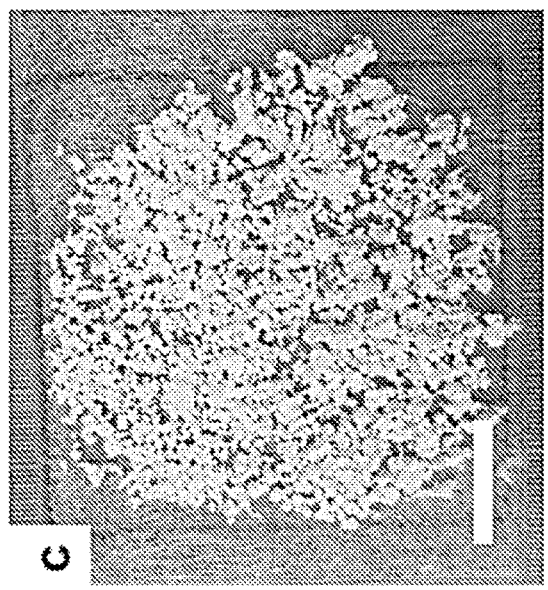
FIG. 10D is a SEM image of a small composite bead, with a scale of the bar at 100 μm, according to an embodiment herein.
Figure 11B:
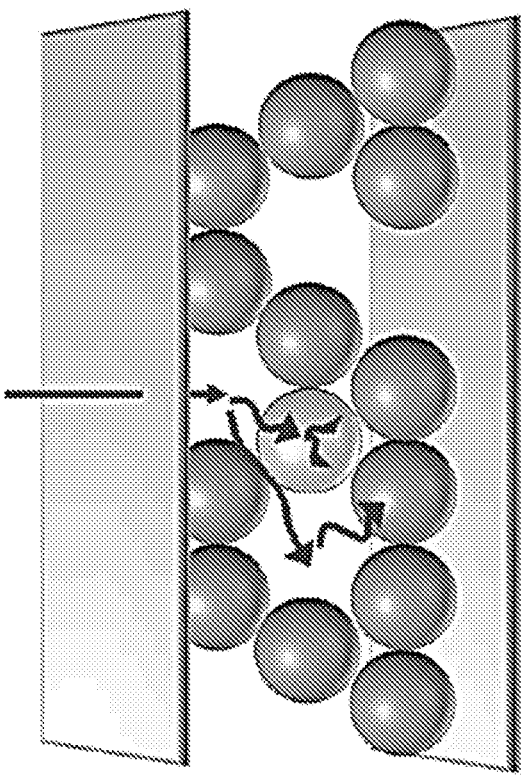
FIG. 11B is a schematic diagram illustrating an idealized diffusion pathway and packing defects of small composite beads, according to an embodiment herein.
Figure 11A:
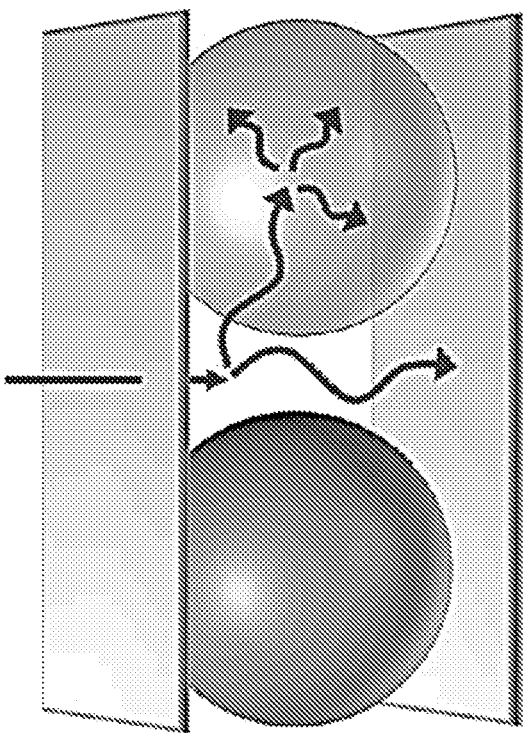
FIG. 11A is a schematic diagram illustrating an idealized diffusion pathway and packing defects of large composite beads, according to an embodiment herein.

The experiment studied the effect of composite bead size, which was tunable based on polymer content as indicated in FIG. 8, and composite loading of the textile on 2-chloroethyl ethyl sulfide (GEES, a distilled mustard agent simulant) permeation properties of swatches fabricated from 80 wt % UiO-66-NH$_2$. Permeation data through swatches made from 100-200 g m⁻² of large (~1.5 mm) beads and 100 g m⁻² of small (~300 μm) beads are shown in FIGS. 9A and 9B, respectively. Moreover, FIGS. 10A-10D illustrate swatch and bead optical and SEM images). As the loading of large MOF beads on the textile swatch increased from 100 g m⁻² to 200 g m⁻², the breakthrough time (time to reach 0.1 μg min⁻¹ cm⁻²) increased from ~120 min to 650 min, and the steady-state permeation rate remained constant at ~0.8 μg min⁻¹ cm⁻². The protection afforded by the higher-loaded sample was over 3× better than a commercial activated carbon fabric, and our textiles also had ~60% lower steady-state CEES permeation rate in comparison to the carbon fabric. Yet, CEES immediately penetrated both composite textiles at low levels because of large gaps associated with the MOF beads as provided in FIG. 9A. Composites with smaller bead diameters (~300 μm) alleviated the immediate penetration and increased breakthrough time from ~120 min to 450 min for 100 g m⁻² loadings on textiles as provided in FIG. 9B albeit with a moderately higher steady-state permeation rate (~1.2 μg min⁻¹ cm⁻²) and further depicted in FIGS. 11A and 11B. Some of the spheres in FIGS. 11A and 11B appear empty to show intraparticle diffusion. The textile swatch made with smaller beads still had a reduced permeation rate in comparison to the carbon fabric (~2.1 μg min⁻¹ cm⁻²). Thus, composite MOF beads provided greatly enhanced protection vs. activated carbon fabric.

Figure 12:
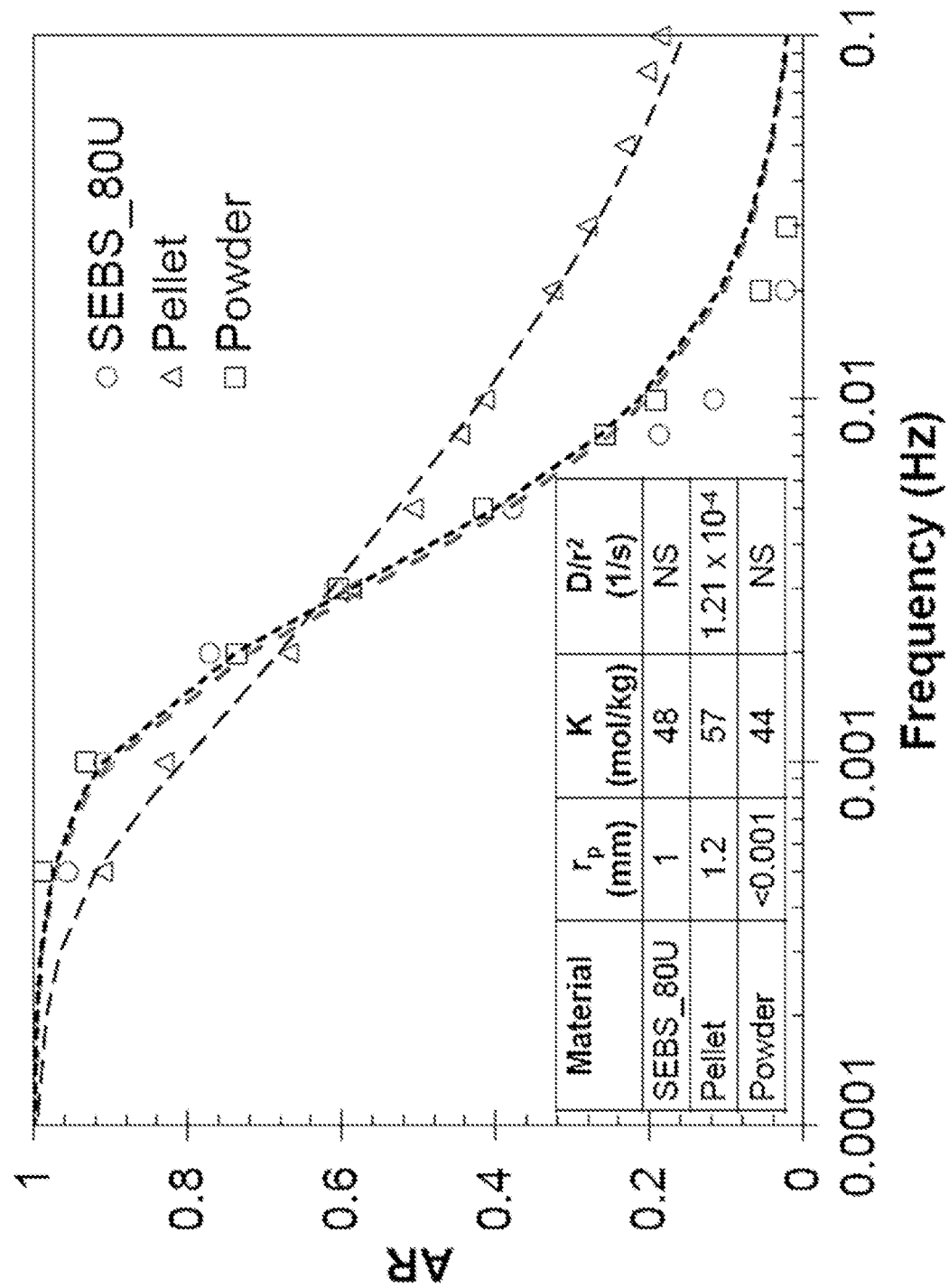
FIG. 12 is a graph illustrating the frequency response of metal-organic-framework (MOF)-polymer composite beads made from G1642 SEBS, MOF pellets, and MOF powder, with the dashed lines corresponding to a Fickian diffusion model fit, with NS defined as "not sensitive" and referring to the $D/r^2$ time constant being too fast to distinguish between internal (micropore and macropore diffusion) and external mass transfer mechanism, according to an embodiment herein.

To demonstrate the benefits of the phase inversion process and the resulting composites in comparison to traditional particle formation processes (e.g., pressurization), the experiment measured and assessed diffusion behavior within the composite using a concentration swing frequency response (CSFR) method. Octane was used to probe diffusion because of its similar shape and size to CEES; CEES was not used directly because it reacts with UiO-66-NH$_2$ and complicates diffusional analysis. Through the introduction of concentration perturbations and measurements of the amplitude ratio (AR) responses, experimental data were obtained and fit to a Fickian diffusion model with the results shown in FIG. 12. This model adequately fits both macropore (>50 nm) and micropore (<2 nm) diffusion depending on particle size. The values for particle size and the two fit parameters of isotherm slope, K, and diffusivity, $D/r^2$, are shown in FIG. 12. The steep curve for the powder MOF indicated fast uptake. The micropore diffusion model, which describes mass transport within MOF crystals, did not accurately fit the data at higher frequencies; thus, the rate was controlled by other mass transfer mechanisms such as external mass transfer or surface barrier resistance under these conditions. For the pure MOF pellet, the curve shape was much shallower than the curve for the MOF powder and was fit accurately by the model. The slower uptake resulted from macropore diffusion resistance (e.g., between MOF crystals) through the entire length of the pellet and was impacted by the density, macroporosity, and size of the engineered particle. This additional resistance is undesirable, as additional mass transfer resistance will cause inefficiency in filtration and reactive processes.

Despite being similar in size to the pressed pellets, the curve shape for SEBS_80U was similar to that of the powder sample. This behavior implied that the polymer did not create any measurable macropore diffusion resistance, and the uptake rate was still controlled by the native MOF particle. Furthermore, the K values for the beads and powder were similar indicating that the octane uptake was the same for both samples and that minimal MOF porosity was blocked by the polymer.

Although efficient barrier properties against toxic chemicals are paramount for protective clothing, materials must be rugged enough to withstand harsh operating conditions. Increasing hardness of beads generally reduces attrition and breakage, and thus is a primary focus for materials development; however, the surface area and porosity of MOFs often is decreased substantially to get to desired hardness levels. In the experiment, pressure was not used, and the underlying high surface area and porosity of the MOF were retained. Instead, the experiment focused on utilizing elastomers for composite beads so that materials could bend and flex as opposed to crush under applied weight and/or rough handling. Moreover, the experiment measured the ability of materials to withstand fracturing by placing MOF/SEBS beads in one vial and pelletized MOF granules in another vial. Each vial was loaded with ball bearings and rotated for 1 h at 60 rpm, and material retention on a 25-mesh sieve was measured before and after the experiment. Approximately 99% of the composite beads were retained on the sieve in comparison to only 19% of the pelletized MOF granules as shown in Table 3.

TABLE 3

| | Retained on 25 mesh screen | | |
|---|---|---|---|
| Sample | Before (g) | After (g) | % Retained |
| SEBS_80U | 0.98 | 0.97 | 99 |
| UiO-66-NH$_2$ Granule | 0.78 | 0.15 | 19 |

The contents of the vial containing the composite beads was unchanged after the test whereas the vial with granules clearly showed fractured MOF granules, i.e., fine, dusty particles. The lack of material attrition during this test indicates that our composite beads are well suited for rugged applications and provide a major advantage over typical MOF pelletization techniques.

Composite Adsorption and Reactivity

With barrier and physical properties of the composites characterized, the experiment investigated the effect of PS content ($f_{PS}$) in SEBS, along with the amount of MOF within composites, on toxic chemical uptake and reactivity. Composite beads containing 80 wt % UiO-66-NH$_2$ were fabricated using SEBS with four different compositions as indicated in Table 4 and analyzed for toxic gas uptake.

TABLE 4

| ID | Description |
|---|---|
| Sigma (PN 200557) | SEBS block copolymer (Mw ~118,000 g/mol) |
| G1645 | SEBS block copolymer ($f_{ps}$ ~0.1) |
| G1642 | SEBS block copolymer ($f_{ps}$ ~0.2) |
| G1650 | SEBS block copolymer ($f_{ps}$ ~0.3) |

Figure 13:
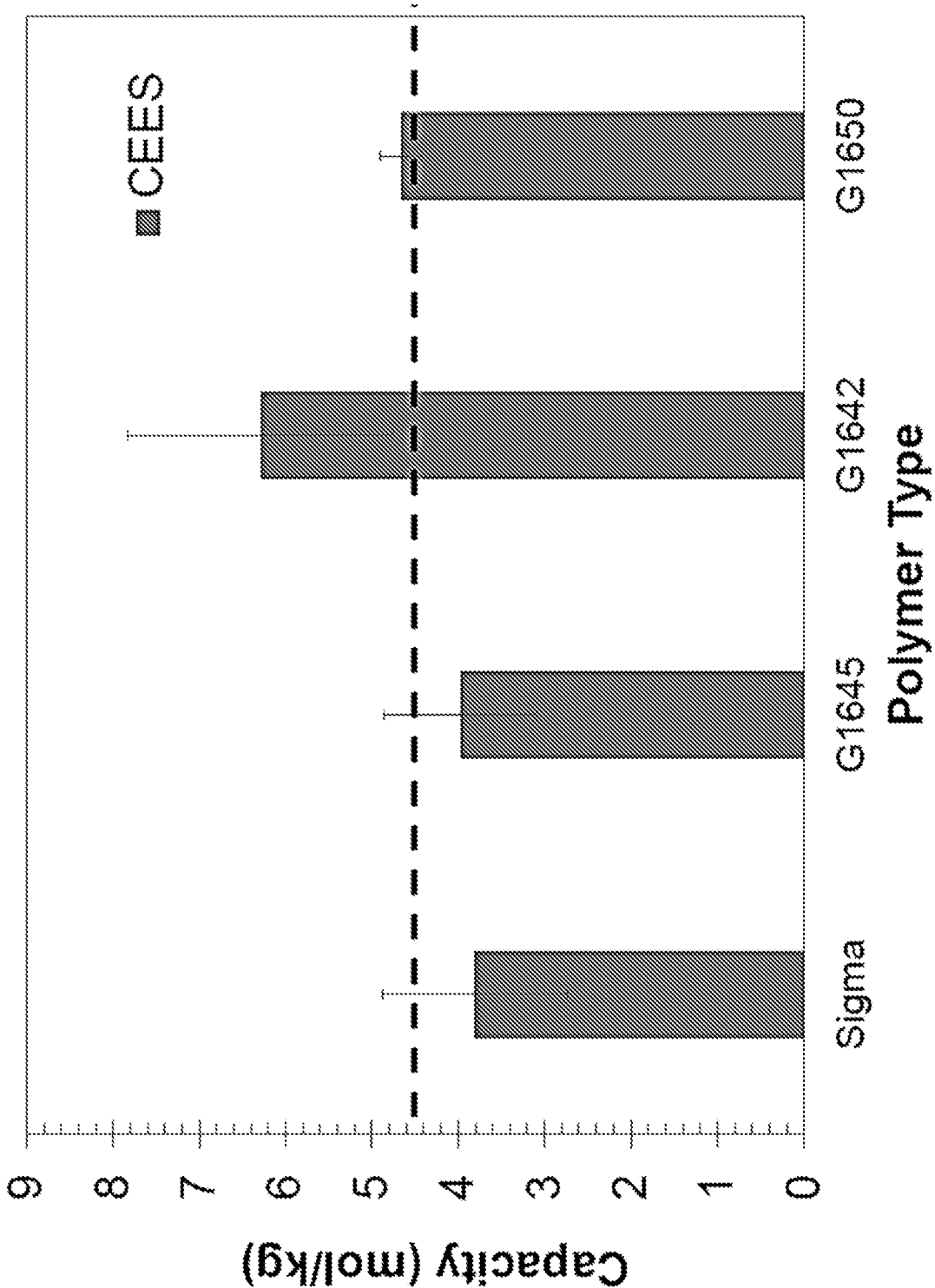
FIG. 13 is a graph of CEES loadings of composites with 80 wt % UiO-66-$NH_2$ made from SEBS with varying amounts of PS, with the dashed line representing CEES loading calculated for pure UiO-66-$NH_2$ powder, according to an embodiment herein.
Figure 14:
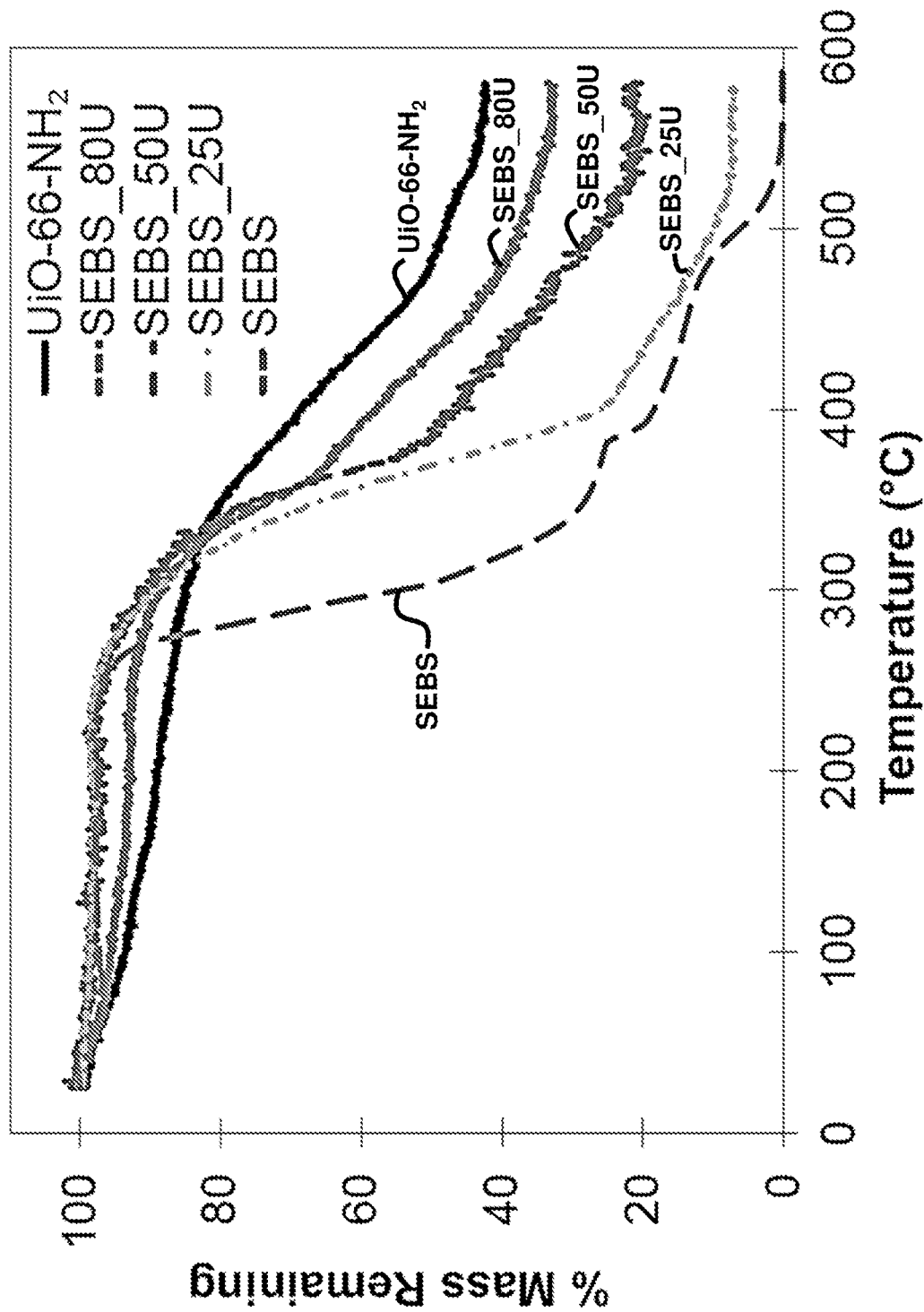
FIG. 14 are thermogravimetric analysis (TGA) curves for samples made from SEBS G1642 specimens, according to an embodiment herein.

CEES capacities were calculated from microbreakthrough testing, and results are shown in FIG. 13. All variants exhibited hierarchical porosity with high CEES uptake, and in particular, the composite made from G1642 ($f_{PS}$ ~0.2) had a significantly higher average CEES capacity when compared to the baseline MOF. This mid-range of PS content likely reduced penetration of ethylene-n n-butylene blocks into the MOF pore structure yet provided enough elastomeric character to form coagulated beads. Thus, vapor uptake was maximized in SEBS with $f_{PS}$ ~0.2.

The effects of MOF wt % on chemical capacity and reactivity within the G1642-based composite were experimentally studied to optimize performance and cost. Materials are notated as SEBS_XU, in which X is the wt % MOF. Thermogravimetric analysis (TGA) data shown in FIG. 14 were collected to determine the actual amount of MOF within the composite after phase inversion as indicated in Table 5, using procedures described above.

TABLE 5

| Sample | Solvent | Nominal MOF wt %* | Wt % @ 200° C. | Wt % @ 580° C. | Calculated MOF wt % from TGA |
|---|---|---|---|---|---|
| UiO-66-NH$_2$ | N/A | 100 | 89.1 | 42.5 | 100 |
| SEBS** | THF | 0 | 97.4 | 0.2 | 0.3 |
| SEBS_25U | THF | 25 | 98.2 | 7.3 | 15.6 |
| SEBS_50U | THF | 50 | 96.7 | 21.1 | 45.7 |
| SEBS_80U | THF | 80 | 92.5 | 33.2 | 75.2 |

*Calculated from contents in starting solution
**All SEBS are G1642

In all cases, the amount of MOF within the composite was within ~10 wt % of that expected given the starting solution concentration. Furthermore, nitrogen isotherm data, shown in FIG. 15A, and subsequent BET surface area analysis were in agreement with hypothetical values (as provided in Table 6 and FIG. 16) on the basis of MOF content for the 80 wt % material (SEBS_80U).

TABLE 6

| Material | MOF wt % | Surface Area (m$^2$/g) | Hypothetical Surface Area (m$^2$/g) | % Deviation |
|---|---|---|---|---|
| SEBS* | 0 | 8 | — | — |
| SEBS_25U | 15.6 | 46 | 201 | −77.1 |
| SEBS_50U | 45.7 | 417 | 589 | −29.2 |
| SEBS_80U | 75.2 | 947 | 969 | −2.2 |
| UiO-66-NH$_2$ | 100 | 1,296 | 1,296 | 0.0 |

*All SEBS are G1642

The SEBS_50U and SEBS_25U composites had ~25% and 75% lower calculated BET surface areas vs. hypothetical values, respectively, which indicated that SEBS partially blocked accessibility to the MOF in composites with low MOF loadings.

Figure 15B:
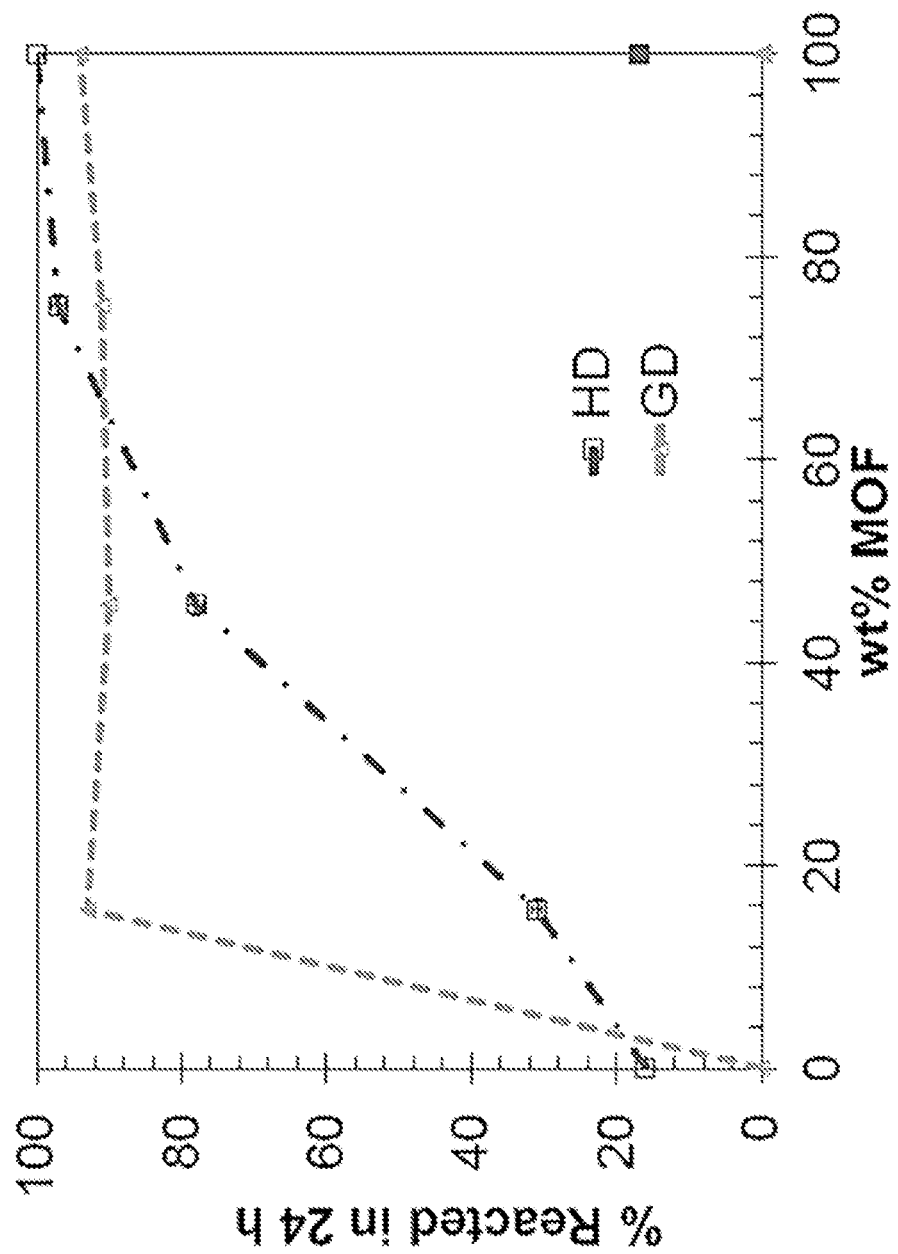
FIG. 15B is a graph illustrating CWA reactivity, according to an embodiment herein.
Figure 15C:
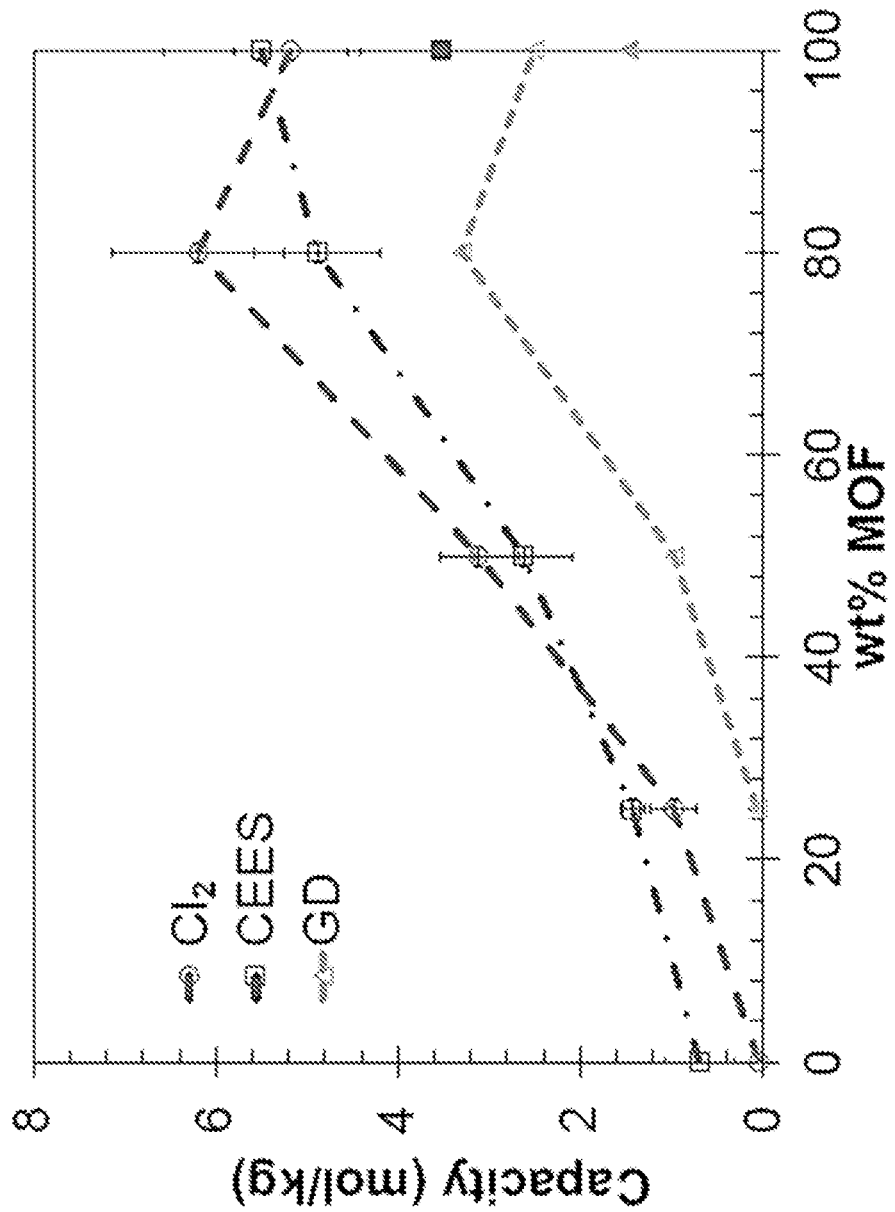
FIG. 15C is a graph illustrating toxic chemical vapor capacity of composite beads as a function of MOF wt %, with filled data points at 100% representing data for activated carbon cloth, according to an embodiment herein.
Figure 15D:
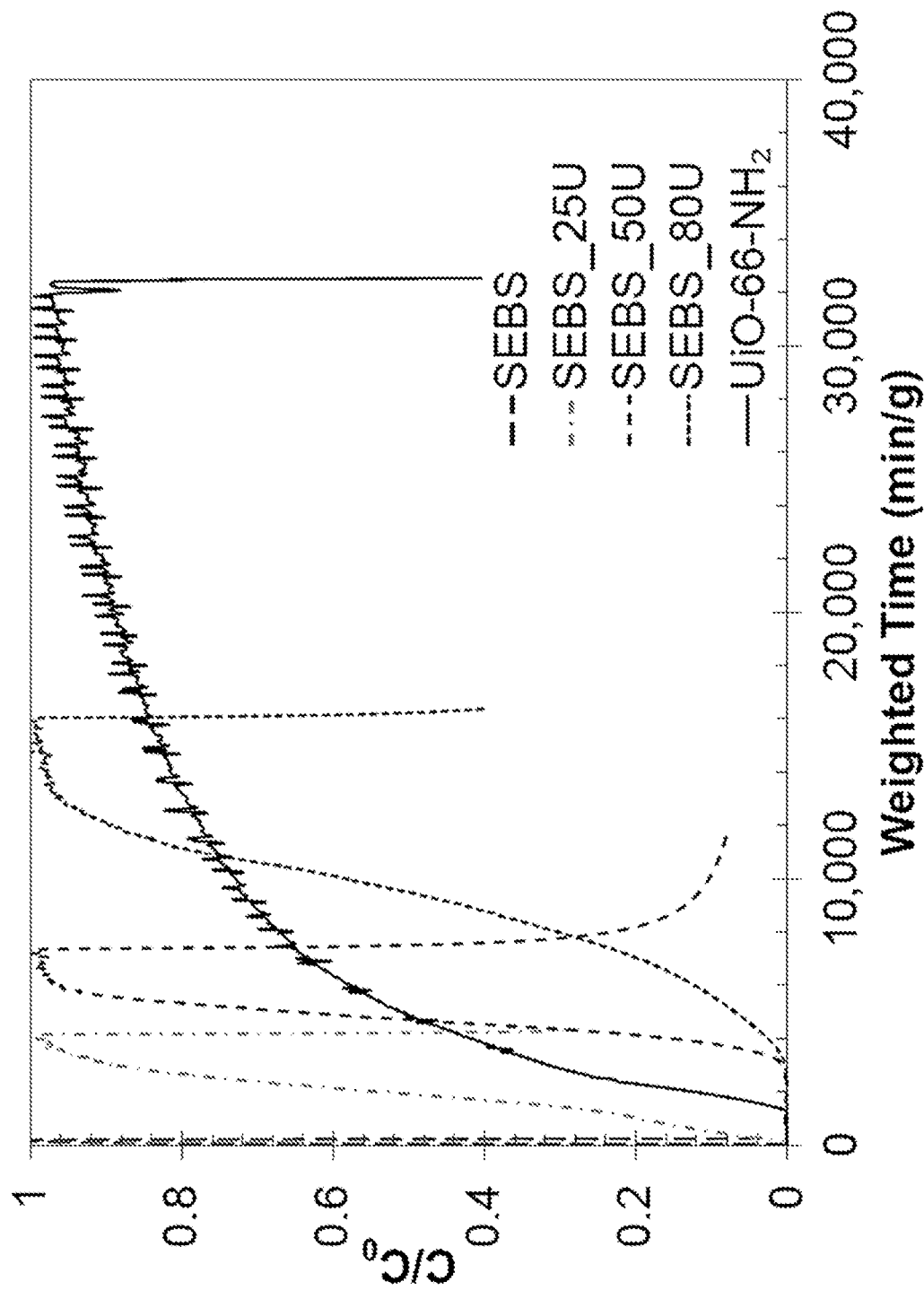
FIG. 15D are chlorine microbreakthrough curves of composites made from UiO-66-$NH_2$ and SEBS G1642, according to an embodiment herein.
Figure 15E:
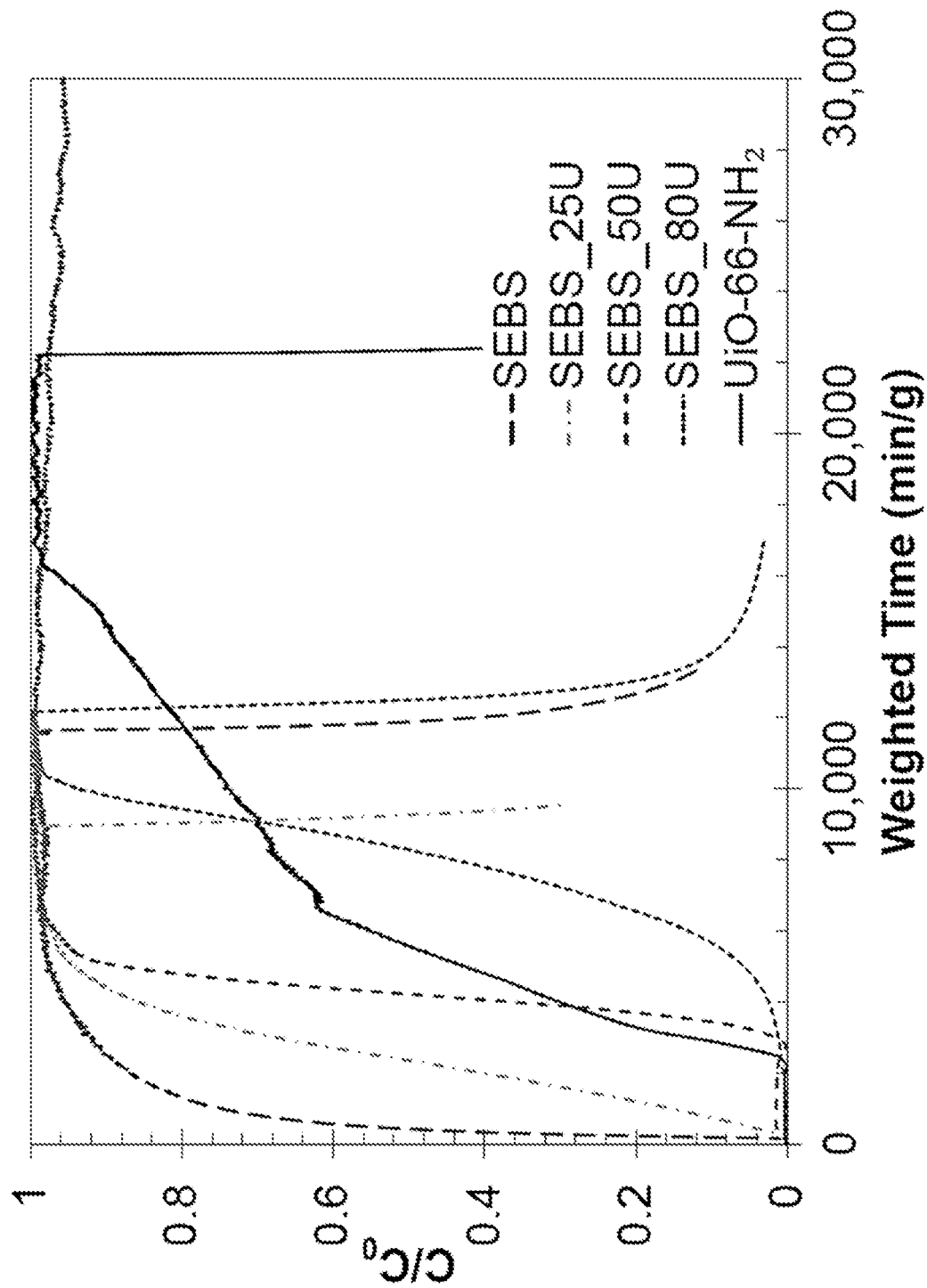
FIG. 15E are CEES microbreakthrough curves of composites made from UiO-66-NH$_2$ and SEBS G1642, according to an embodiment herein.
Figure 15F:
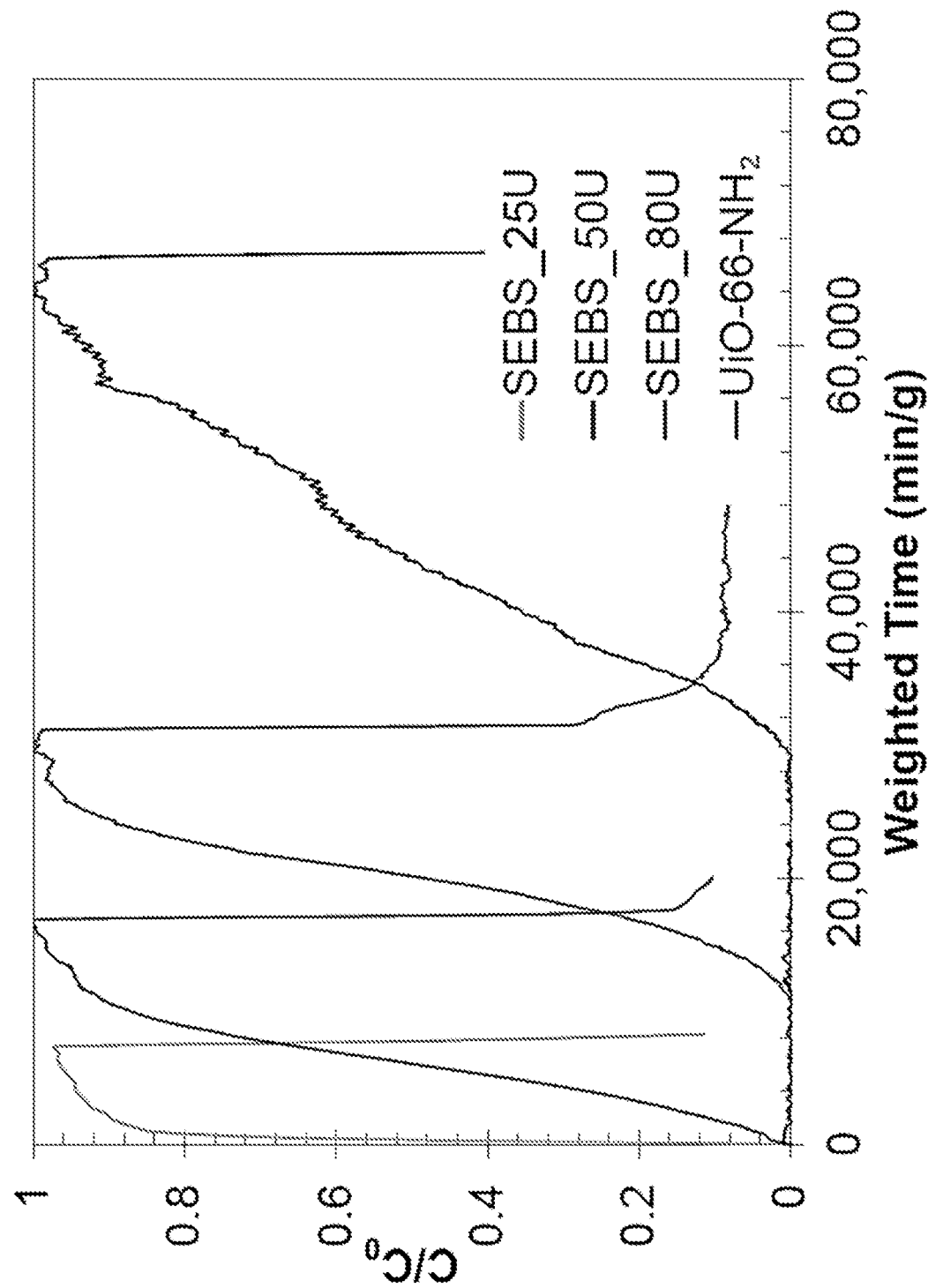
FIG. 15F are Soman (GD) microbreakthrough curves of composites made from UiO-66-NH$_2$ and SEBS G1642, according to an embodiment herein.
Figure 16:
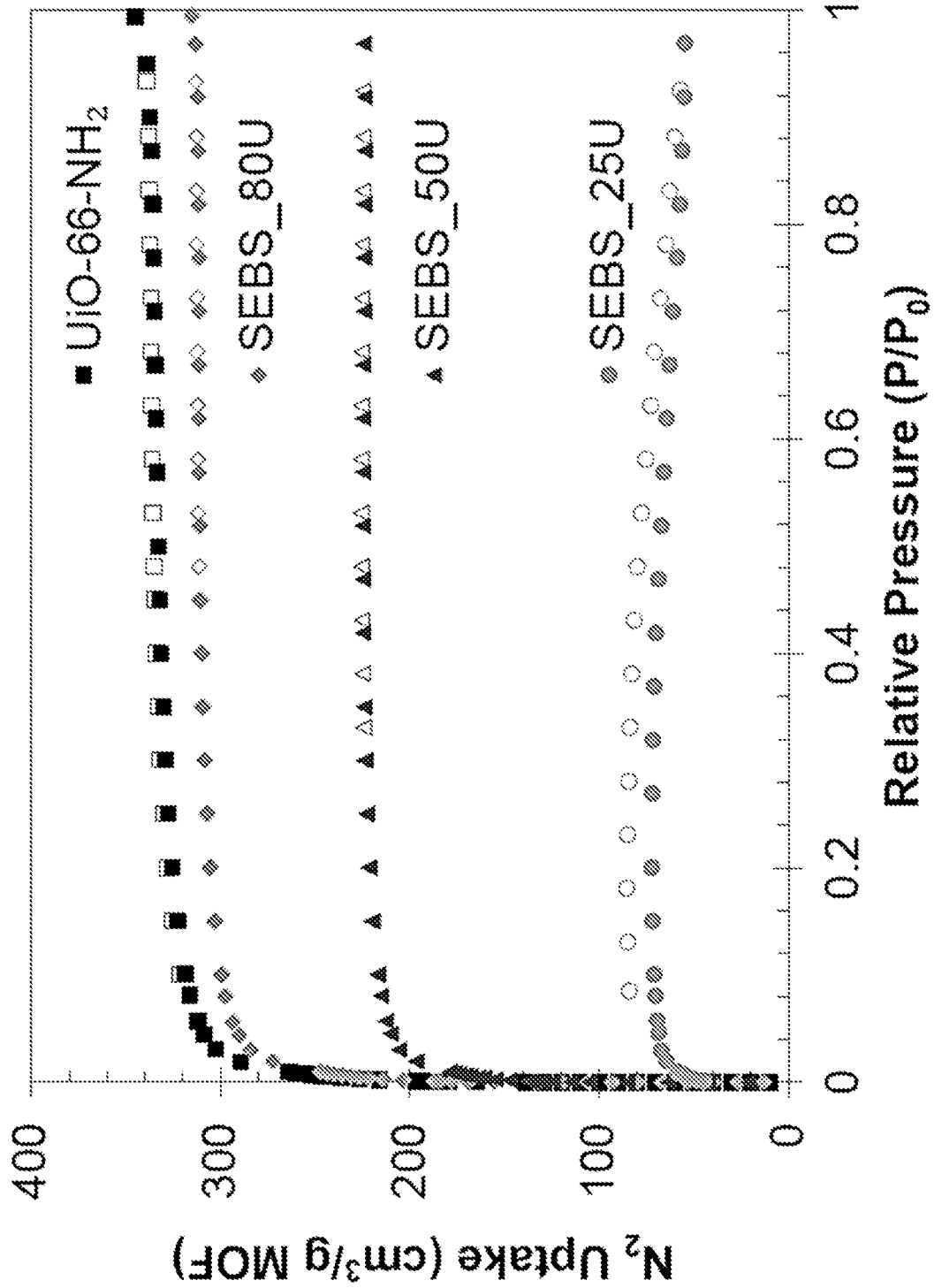
FIG. 16 is a graph illustrating N$_2$ isotherm data of composites made from UiO-66-NH$_2$ and SEBS G1642, with the adsorption depicted by filled data points, and desorption depicted by unfilled data points, and with the data being plotted on a MOF mass basis, according to an embodiment herein.

The activity of the MOF beads towards CWAs was evaluated using a dose-extraction method, with; data are shown in FIG. 15B. The activity of the experimental composites to the nerve agent soman (GD) and blister agent mustard (HD) was related to their known tendency to react with the native UiO-66-$NH_2$. Whereas, only a small amount of MOF (25 wt %) was required for almost full conversion of GD, more MOF was required for full HD conversion. HD activity of the composites may have been related to a combination of agent absorption into SEBS and reaction with the MOF. In composites of pure SEBS, some liquid HD permanently absorbed into the SEBS polymer and may have prevented subsequent access and reactivity in the MOF. For both CWAs, SEBS_80U samples provided approximately the same CWA reactivity as the baseline MOF sample, likely a result of enhanced diffusion of the chemicals through the macropores to active sites within the MOF micropores. The increased activity on a mass basis ultimately would reduce the amount of MOF required for a similar level of protection in a given application.

The toxic chemical vapor capacity of composites followed similar trends to the reactivity with respect to MOF loading as provided in FIGS. 15C-15F. CEES absorbed into the baseline polymer, and the resulting capacity was nearly a direct linear relationship with wt % MOF. Composites with less than 50 wt % MOF had limited capacity for vaporous GD; however, the GD capacity for SEBS_80U was higher than the pure MOF powder. The same behavior was seen for $Cl_2$ capacity, indicating that SEBS blocks access to the MOF for composites with low loading, but actually enhances access to the MOF in the 80% samples in comparison to pure MOF powder.

Composite Mixtures

Figure 17B:
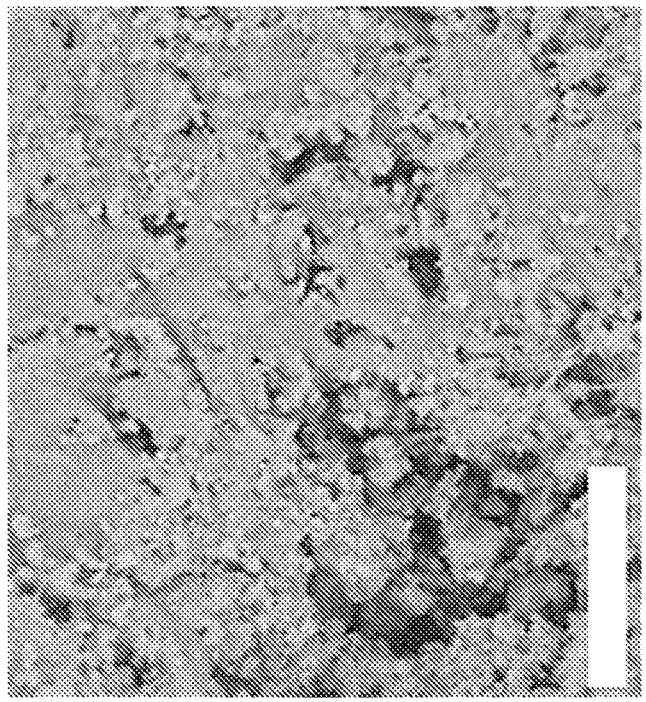
FIG. 17B is a SEM image of SEBS_80U/H made with G1642, with a scale of the bar at 30 μm, according to an embodiment herein.
Figure 17A:
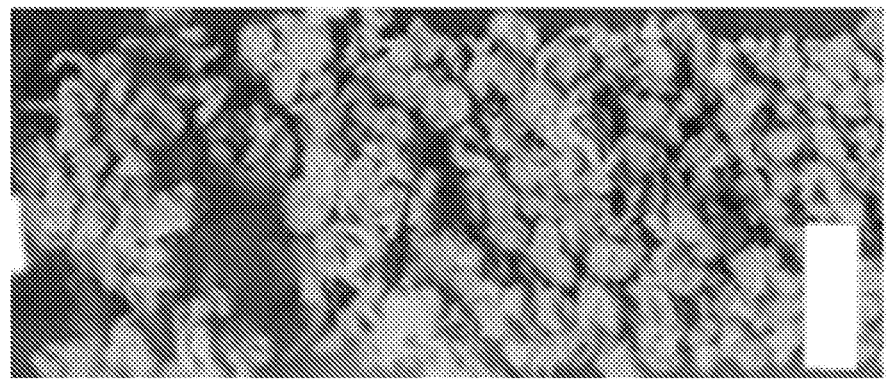
FIG. 17A is an optical image of SEBS_80U/H made with G1642, with a scale of the bar at 0.5 inches, according to an embodiment herein.
Figure 17D:
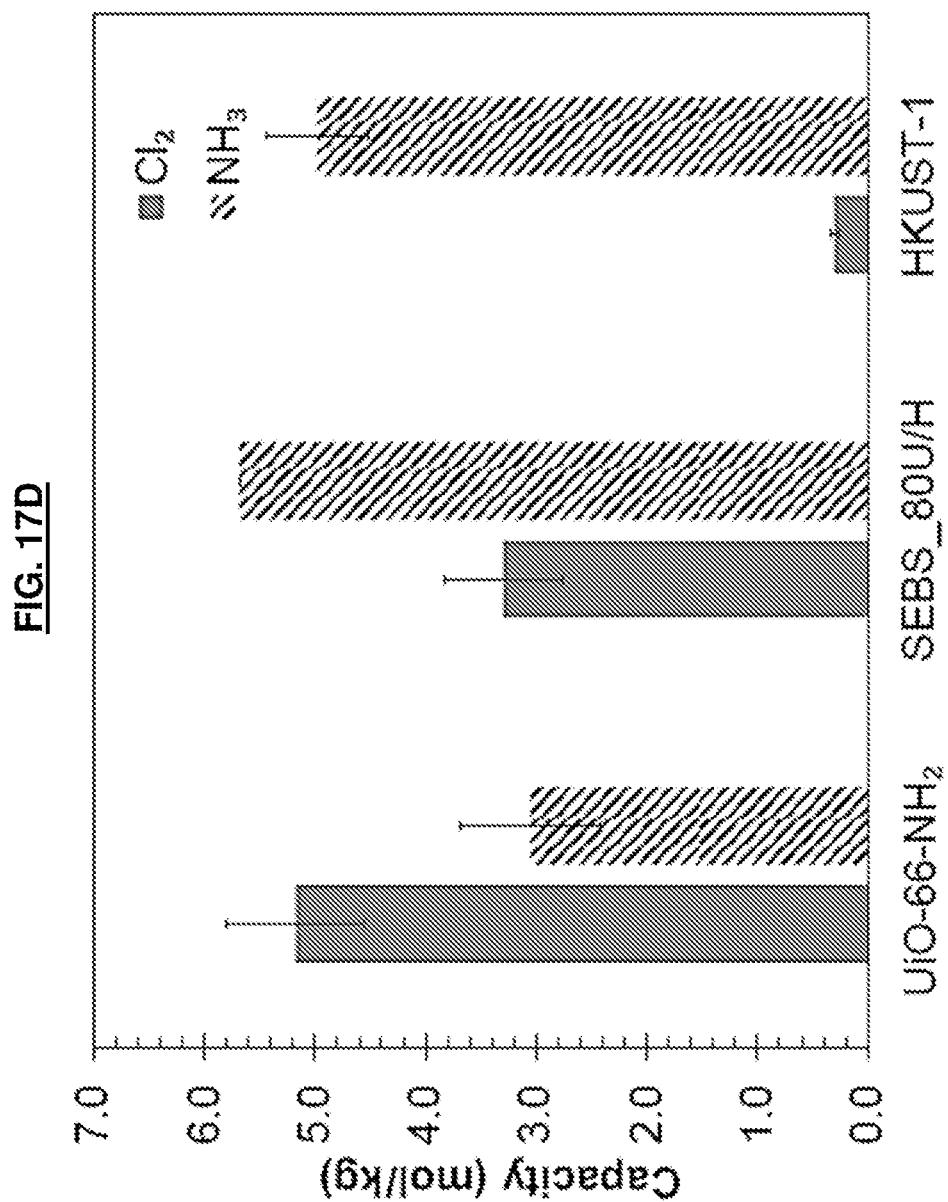
FIG. 17D is a graph illustrating Cl$_2$ and NH$_3$ capacities of SEBS_80U/H in comparison to pure MOF components, according to an embodiment herein.
Figure 17E:
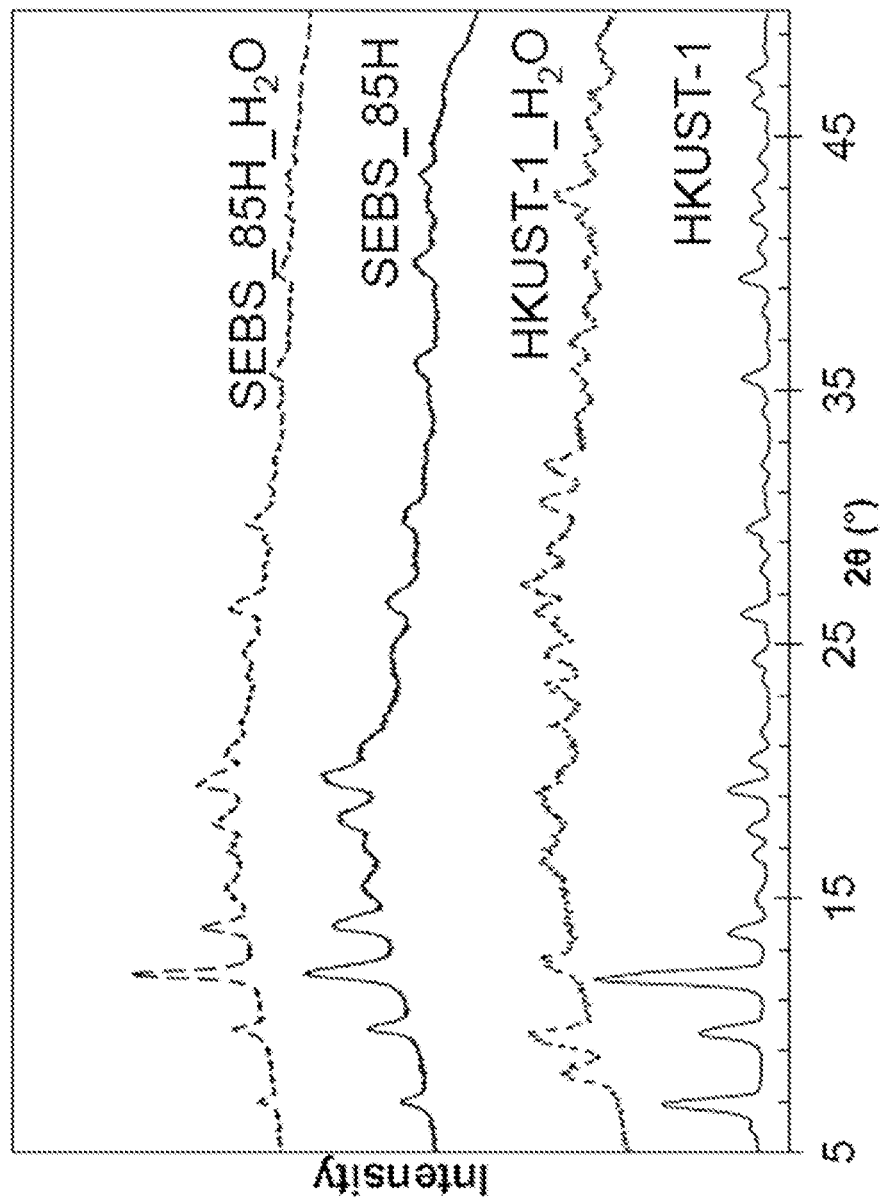
FIG. 17E is a graph illustrating the powder X-ray diffraction (PXRD) of HKUST-1 powder and composite made with HKUST-1 before and after liquid water exposure, according to an embodiment herein.
Figure 18:
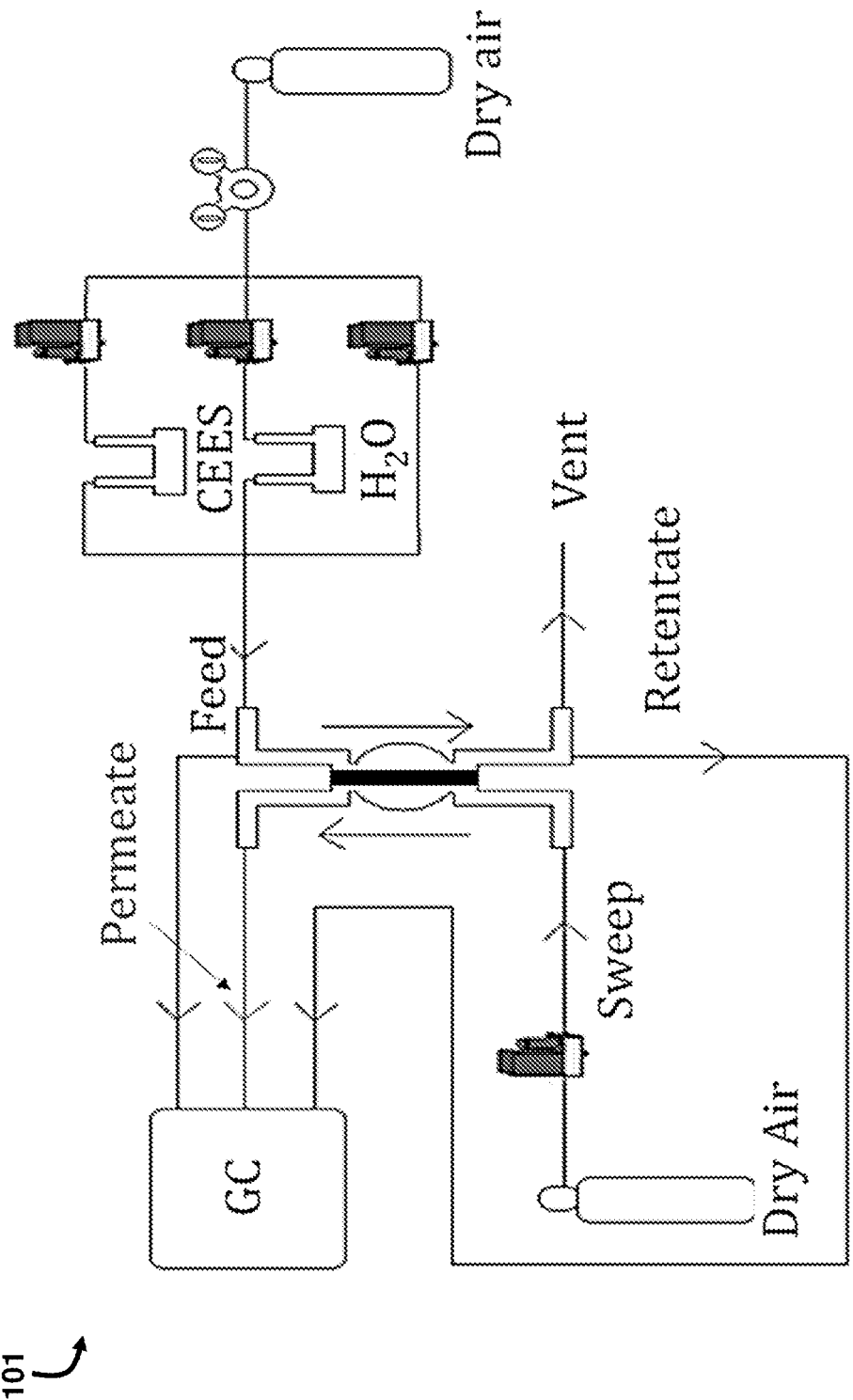
FIG. 18 is a schematic diagram of a permeation system with the permeate designation representing the CEES flow permeating through the composite beads, and with GC referring to gas chromatography, as used in accordance with the embodiments herein.

Beyond suits, toxic chemical filtration is a key requirement for protection devices. For effective filtration, materials must react efficiently with specific groups of chemicals, such as acids $Cl_2$) and bases (e.g., $NH_3$) and be layered into a filter, or have broad-spectrum reactivity for a single layer system. Layering packed beds with multiple highly efficient adsorbents is more challenging from a manufacturing perspective as layering beds requires alterations to filter design. Additionally, the development of a broad-spectrum composite material is more difficult from a materials development standpoint because multiple chemistries are required to react with a wide range of toxic chemicals without neutralizing each other within the pore structure. Phase-inverted composites enable a single-layer filter by combining multiple highly efficient MOFs within a single bead. This approach alleviates the concern of cross-reactivity as chemistries are physically separated—solid crystals will not neutralize one another. Among the thousands of potential industrial and warfare compounds, $Cl_2$ and $NH_3$ stand out because of their ubiquity, relative ease of acquisition, and toxicity. As discussed above, $Cl_2$ is removed effectively by UiO-66-$NH_2$; however, this MOF has a lower $NH_3$ capacity. HKUST-1, a Cu-based MOF, is one of the most effective materials for $NH_3$ filtration, but has relatively low capacities for other chemicals, including $Cl_2$. Using the phase inversion method, beads are experimentally fabricated (total MOF content ~80 wt % in SEBS) comprising of 50/50 w/w mixtures of UiO-66-$NH_2$ (U) and HKUST-1 (H) to determine the feasibility of a mixed-MOF filtration material (SEBS_80U/H) for applications such as single-use filters. The materials were green, which indicated a good physical mixture of the yellow UiO-66-$NH_2$ and blue HKUST-1. Good dispersion of the MOFs was evidenced further by well-mixed large crystals (HKUST-1) and small crystals (UiO-66-$NH_2$) as noted in optical images shown in FIG. 17A, SEM images shown in FIG. 17B. Homogeneous mixing of crystals also was demonstrated by the distribution of Zr and Cu within energy dispersive X-ray (EDS) elemental image maps shown in FIG. 17C. The composite had a $Cl_2$ capacity ~⅔ of that of UiO-66-$NH_2$ but ~10× greater than HKUST-1 based on breakthrough results shown in FIG. 17D. Interestingly, the average $NH_3$ capacity of the composite exceeded that of HKUST-1 and was ~2× greater than UiO-66-$NH_2$. Thus, the composites clearly have advantages over baseline powders as demonstrated by the high $Cl_2$ and $NH_3$ capacities. A further aspect of the experimental composite provided by the embodiments herein is the stabilization of the crystal structure of HKUST-1, which typically breaks apart after exposure to water. A 24 h liquid water exposure had limited effect on structure degradation in the SEBS_HKUST-1 composite as confirmed by powder X-ray diffraction (PXRD) data as shown in FIG. 17D. High surface area should be maintained in the beads based on studies of MOF-polymer composites in other form factors made from PS and poly(styrene-block-isoprene-Mock-styrene). Based on the capacity and stabilization data of the mixture, it is clear that additional composites containing a variety of porous and/or active sorbents, MOFs, or otherwise, can be fabricated for highly specific and tunable protection (or other) applications.

Novel elastomer-based MOF composites beads have been formulated via phase inversion of UiO-66-$NH_2$ and SEBS as replacements for activated carbon in fabrics used for personal protective suits. Textiles made from the composite beads had up to 3.5× greater protection time against CEES (a simulant for the CWA, HD) and ~60% reduction in steady-state permeation rate relative to activated carbon cloth. Analysis suggests that the phase inversion process resulted in the generation of macropores that enhanced diffusion rates vs. traditional MOF pellets and granules. The elastomeric composite resisted attrition when subjected to a hardness test, making the material an attractive candidate for integration into protective suits. Furthermore, composite beads containing 80 wt % UiO-66-NH2 had higher capacities for $Cl_2$ and GD, and equivalent reactivity towards GD and FID, in comparison to pure MOF powders. Finally, composite beads were fabricated with mixtures of UiO-66-$NH_2$ and HKUST-1, and the resulting beads had broader protection against Cl 2 and $NH_3$ than the individual component powders. Thus, the phase inversion method opens the door for composites that provide enhanced reactivity in filtration, separations, and other applications via mixing of multiple MOFs.

Bead formation. SEBS beads initially were fabricated in the absence of MOF to determine the effect of phase inversion solvent on particle shape and the effect of wt % polymer in solution on particle size. In the former experiment, SEBS (0.5 g, Sigma Aldrich®, $M_w$=118,000 g/mol) was dissolved in THF (5 mL, Millipore Sigma®, >99.9%) and stirred magnetically for ~4 h. The solution was added dropwise through a 25-gauge hypodermic needle to pure ethanol (~100 mL, Sigma Aldrich®, 99.5%), pure distilled water (~100 mL), or a 75/25 ethanol/water (v/v) solution (~100 mL). After ~2 h, the mixture was poured through a TechWipe® cloth and allowed to dry in air for ~2 h, and then dried at ~120° C. under vacuum for ~16 h. To study the effects of polymer concentration on bead size, SEBS (0.25 g, 0.5 g, and 1.0 g) was dissolved in THF (5 mL, Sigma Aldrich®, 99.0%) to make 5, 10, and 20 w/v solutions, respectively. Beads were fabricated using the phase inversion process discussed above. Composite beads containing the MOF, UiO-66-$NH_2$ (available from TDA Research, Inc.), were fabricated with several SEBS formulations ($f_{PS}$ ~0.1, 0.2, and 0.3). To generate composite particle, UiO-66-NH$_2$ (between 0.25 and 1.0 g) was mixed with SEBS (0.25 g) in THF (5 mL), and the dispersion was stirred magnetically for at least 4 h. Beads were fabricated using the phase inversion approach discussed above. Materials are labeled as SEBS_XU, for which X is the wt % UiO-66-NH$_2$ in the composite bead as determined from the starting solution.

Physical Characterization. SEM and EDS images were obtained using a Phenom GSR™ desktop SEM. Samples were placed on double-sided carbon tape and sputter-coated with gold for 30 s prior to analysis. Images were taken using an accelerating voltage of 15 kV at a working distance of 10 mm. PXRD measurements were obtained on a Rigakuφ Miniflex 600 X-ray powder diffractometer with a D/Tex detector. Samples were scanned using Cu Kα radiation at 40 kV and 15 mA and at a rate of 5° min$^{-1}$ over a range of 3° to 50° 2θ. Thermogravimetric analysis (TGA) measurements were obtained on a TA Instruments® Q500 over a temperature range from 25° C. to 600° C. at a heating rate of 10° C. min$^{-1}$ in nitrogen. TGA data were analyzed in accordance with similar procedures in the literature to account for any remaining solvent present in the samples. Nitrogen uptake was measured at 77 K in a Micromeritics® ASAP 2040 instrument. Samples were off-gassed at 60° C. for ~16 h under vacuum. The Brunauer-Emmett-Teller method was used to calculate the specific surface area in m$^2$ g$^{-1}$.

Dose-Extraction Experiments. Reactivity of the composites toward GD and HD was measured. The composite (50 ma) was dosed with CWAs (~5 µg) in a vial and allowed to age for 24 h, after which composites were extracted with solvent. The solvent was analyzed for residual agent, and the amount removed/reacted was calculated by difference.

Microbreakthrough Testing. Composites were dosed with vaporous toxic chemicals as probes for MOF accessibility within the composites. Cl$_2$, CEES, NH$_3$, and GD breakthrough tests were conducted using a method and system described in the literature. Briefly, composites were packed into a 4-mm-diameter fritted glass tube. For Cl$_2$ and NH$_3$, a ballast was prepared by injecting neat chemical into a stainless-steel vessel and pressurizing; the resulting volume was mixed with a diluent stream at a rate necessary to achieve a concentration of ~4,000 mg m$^{-3}$ for Cl$_2$ and ~2,000 mg m$^{-3}$ for NH$_3$. For CEES and GD, an air stream was flowed over a saturator cell containing the chemical, and the resulting saturated vapor was mixed with a diluent air stream to achieve concentrations of ~4,000 and ~2,000 mg m$^{-3}$, respectively. The effluent was monitored continuously using a photoionization detector for Cl$_2$, a flame ionization detector for CEES, and Fourier transform infrared detector for GD. Chemical capacities were calculated in mol kg$^{-1}$ by subtracting the integral of the effluent curve from the integral of the feed stream, which was assumed to be a square wave. The system exhibited ~20% standard deviation with respect to saturation capacity.

CEES Permeation Testing. CEES permeation testing was conducted in accordance with ASTM F739-12 using the system 101 shown in FIG. 18. Composite beads were loaded between a nylon/cotton fabric and polyamide fusible bond webbing at 100 and 200 g m$^{-2}$ and then pressed with an iron for ~10 s per side. The resulting textile was evaluated in a 1-in.-diameter Pesce PTC 700 permeation test cell. Two air streams of equal flowrate (300 mL min$^{-1}$) and relative humidity (0%) were applied above and below the composite fabrics. The CEES concentration in the feed stream was 300 mg m$^{-3}$, and the CEES concentration was monitored at three locations in the permeation cell: the inlet feed to the test cell, the outlet retentate from the test cell, and the outlet permeate from the test cell on the opposite side of the swatch. The test run was terminated after the system reached steady state. The breakthrough time (tB) was calculated for each film as the time taken for the permeate to reach a permeation rate of 0.1 µg cm$^{-2}$ min$^{-1}$.

Concentration Swing Frequency Response (CSFR). Octane diffusion was measured using a CSFR apparatus. Approximately 20 mg of adsorbent was regenerated for 8 h under vacuum at 90° C. for accurate weight measurements. The sample then was loaded into a shallow bed and placed under vacuum at room temperature with a 1 cm$^3$ min$^{-1}$ He flow for 16 h. A He carrier stream flowed through a sparger filled with octane to generate a saturated feed stream that then was mixed with a pure He stream upstream of the adsorbent bed. Both streams were controlled with MKS mass flow controllers to create a 4,000 mg m$^{-3}$ steady-state concentration and total flow rate of 20 cm$^3$ min$^{-1}$. The pressure in the adsorbent bed was maintained at 1 bar by a MKS Baratron® pressure controller, and effluent gas from the adsorbent bed was sampled by an Agilent® 5975 mass spectrometer. The CSFR system was allowed to reach steady state, and then, the mass flow controllers were used to introduce sinusoidal perturbations, 180° out of phase, to the flowrates of each stream. The resulting feed stream to the adsorbent bed had a constant flow rate with a sinusoidal concentration swing around the steady-state, gas-phase concentration. The perturbations were performed at different frequencies in the range of 0.0005 to 0.1 Hz. The collected data are presented as plots of the amplitude ratio (AR) as a function of the perturbation frequency, in which the AR is calculated from the amplitude of the concentration oscillations in the gas exiting the adsorbent bed divided by the amplitude in the gas concentration entering the adsorbent bed. The diffusion mechanism and rate parameters can be extracted by fitting the data to a mathematical model derived from transfer functions.

Attrition Testing. The attrition resistance of materials was tested by placing ~1 g of composite and MOF pellet into separate 20 mL scintillation vials with 5 6-mm ball bearings. The vials were rotated for 1 h at ~60 rpm. The mass of material retained on a 25 U.S. standard mesh sieve was measured before and after the test. Hardness, or resistance to attrition, was determined by the mass of material remaining on the sieve.

Hansen Solubility Parameter Analysis

The phase inversion process is impacted by both kinetic and thermodynamic factors. Kinetic effects can be linked to diffusion and exchange rates of solvent/non-solvent, while thermodynamic effects can be related to phase diagrams between polymer, solvent, and non-solvent. These thermodynamic effects can be informed by solubility parameter analyses. Reducing the solubility parameter difference, between polymer and solvent, generally leads to improved solubilization; however, in the case of phase inversion, larger differences are targeted.

Hansen solubility parameters were used to compare solvents for phase inversion. Values obtained for solvents and polymers, shown in Table 7, were obtained from the Hansen Solubility Parameters in Practice software (HSPiP).

TABLE 7

| Solvent/Polymer | $\delta_d$ (MPa$^{0.5}$) | $\delta_p$ (MPa$^{0.5}$) | $\delta_h$ (MPa$^{0.5}$) |
| --- | --- | --- | --- |
| Tetrahydrofuran (THF) | 16.8 | 5.7 | 8.0 |
| Water | 15.5 | 16.0 | 42.3 |
| Ethanol | 15.8 | 8.8 | 19.4 |
| Dichloromethane (DCM) | 18.2 | 6.3 | 6.1 |
| Polystyrene (PS) | 18.0 | 5.0 | 5.0 |
| Polyethylene (PE) | 16.9 | 0.8 | 2.8 |
| Polybutylene (PB) | 17.4 | 4.3 | 8.4 |

The total solubility parameter, $\delta_t$, can be estimated from the three individual components as described in Eq. 1, and the solubility radius, $R_a$, between the polymer and solvent can be calculated using Eq. 2. Generally, as $R_a$ approaches zero, polymers are more-easily dissolved in the solvent. A comparative relationship, known as the relative energy difference (RED), is calculated by the ratio of the solubility radius and radius of the Hansen solubility sphere, $R_o$ (Eq. 3). $R_o$ has been estimated for many polymers based on interactions with a variety of solvents. RED values less than 1 indicate a propensity for solvation, while values above 1 suggest phase separation will occur.

$$\delta_t^2 = \delta_d^2 + \delta_p^2 + \delta_h^2 \quad (1)$$

$$R_a = \sqrt{4*(\delta_{d1} - \delta_{d2})^2 + (\delta_{p1} - \delta_{p2})^2 + (\delta_{h1} - \delta_{h2})^2} \quad (2)$$

$$RED = \frac{R_a}{R_0} \quad (3)$$

Values for the individual Hansen parameters were gathered for several solvents and individual polymeric constituents of poly(styrene-block-ethylene-ran-butylene-Nock-styrene) (SEBS) (i.e., polystyrene [PS], polyethylene [PE], and polybutylene [PB]). Values calculated for $R_a$ and RED are summarized in Table 8.

TABLE 8

| | | | Polymers | | |
| --- | --- | --- | --- | --- | --- |
| Parameters | | | PS | PE | PB |
| $R_0$* | | | 10 | 8 | 7.4 |
| Solvent | THF | $R_a$ | 3.9 | 7.1 | 1.9 |
| | | RED | 0.4 | 0.9 | 0.3 |
| | DCM | $R_a$ | 1.7 | 6.9 | 3.4 |
| | | RED | 0.2 | 0.9 | 0.5 |
| Non-solvent | Water | $R_a$ | 39.2 | 42.4 | 36.1 |
| | | RED | 3.9 | 5.3 | 4.9 |
| | Ethanol | $R_a$ | 15.5 | 18.6 | 12.3 |
| | | RED | 1.6 | 2.3 | 1.7 |

*$R_0$ obtained from HSPiP software

Based on the initial analysis, distilled water and ethanol (Sigma Aldrich®, 99.5%) were chosen as non-solvents for SEBS; THF (Sigma Aldrich®, 99.0%) and dichloromethane (DCM, Sigma Aldrich®, 99.9%) were chosen as solvents for SEBS that are miscible and immiscible with water, respectively. THF was chosen in lieu of other water-miscible solvents, such as dimethylformamide, due to its higher volatility and ease of removal from MOF composites.

Concentration Swing Frequency Response (CSFR)

The mass balance of the adsorbent bed is given by:

$$\frac{dy_{o,b}}{dt} + \frac{M}{V_b c_0}\frac{dn}{dt} = \frac{F}{V_b}(y_{i,b} - y_{o,b}) \quad (4)$$

in which $y_{i,b}$ and $y_{o,b}$ are the gas phase concentrations in and out of the bed, respectively, is adsorbent mass, $V_b$ is bed volume, co is the steady-state concentration, n is the adsorbed phase concentration, and F is the flow rate. Laplace transformation is used to convert from a time to frequency domain, and the equation can be rearranged to give the following transfer function:

$$G_b = \frac{\overline{y}_{o,b}}{\overline{y}_{i,b}} = \frac{\alpha_b}{\left(\alpha_b + s\left(1 + \frac{M}{V_b c_0}G_n\right)\right)} \quad (5)$$

in which Gb is the overall bed transfer function, $\overline{y}_{o,b}$ and $\overline{y}_{i,b}$ are the average outlet and inlet gas phase concentrations, respectively, $\alpha_b$ is the ratio of flow rate to bed volume, s is the complex Laplace argument (s=j$\omega$ with $\omega$=frequency), and G1, is the adsorbed phase transfer function. The adsorbed phase transfer function is used to introduce Fickian diffusion models for micropore and macropore controlled diffusion. For powders, micropore diffusion in a spherical domain is given by:

$$\frac{\partial n}{\partial t} = \frac{1}{r^2}\frac{\partial}{\partial r}\left(D_s r^2 \frac{\partial n}{\partial r}\right) \quad (6)$$

$$n = n* \text{ at } r = r_s \quad (7)$$

$$\frac{\partial n}{\partial r} = 0 \text{ at } r = 0 \quad (8)$$

in which n is the adsorbed phase concentration, n* is the equilibrium adsorbed concentration, which is determined from equilibrium isotherms, r is the radial coordinate, $r_s$ is the radius of the macroporous domain, $D_s$ is the micropore (surface) diffusivity, and t is time. For macropore diffusion, the governing equation is given by:

$$\rho_p \frac{\partial n}{\partial t} + \varepsilon_p \frac{\partial c_p}{\partial t} = \frac{\varepsilon_p D_p}{r^2}\frac{\partial}{\partial r}\left(r^2 \frac{\partial c_p}{\partial r}\right) \quad (9)$$

$$c_p = c \text{ at } r = r_p \quad (10)$$

$$\frac{\partial c_p}{\partial r} = 0 \text{ at } r = 0 \quad (11)$$

in which $\rho_p$ is the particle density, $\varepsilon_p$ is the macroporosity, $D_p$ is the macropore diffusivity, $c_p$ is the gas-phase concentration in the macropores, and $r_p$ is the radius of the macropore domain. For a linearized system, the adsorbed phase concentration is in equilibrium with the gas phase concentration in the macropores such that:

$$n = Kc_p \quad (12)$$

in which K is the local isotherm slope. The insertion of Eq. 12 into Eq. 9 gives:

$$\frac{\partial c_p}{\partial t} = \frac{D_p/r^2}{\rho_p K/\varepsilon_p + 1}\frac{\partial}{\partial r}\left(r^2 \frac{\partial c_p}{\partial r}\right) \quad (13)$$

which has the same functional form as Eq. 6. As a result, any data set that can be fit by the micropore diffusion model also can be fit by the macropore diffusion model. Both the micropore and macropore model can be solved by Laplace transformation to give the adsorbed phase transfer function:

$$G_n(s) = \frac{\bar{n}}{\bar{P}} = \frac{3K'}{s/\eta}\left[\sqrt{s/\eta}\coth\left(\sqrt{s/\eta}\right) - 1\right] \quad (14)$$

in which K' is an isotherm slope parameter, η is a mass transfer parameter, and s is the Laplace domain complex argument. While the regressed K' and η will be the same for any given data set, they represent different parameters depending on the model chosen and are related by:

$$K \Leftarrow K' \Rightarrow K + \varepsilon_p/\rho_p \quad (15)$$

$$D_s/r_s^2 \Leftarrow \eta \Rightarrow \frac{D_p/r_p^2}{\rho_p K/\varepsilon_p + 1} \quad (16)$$

in which the micropore and macropore diffusion parameters are given by the left-hand side and right-hand side, respectively, of Eq. 15 and Eq. 16. Both models represent isothermal conditions, which is a reasonable assertion for flow-through systems.

According to the embodiments, a phase inversion process is used to fabricate composite beads from the metal-organic framework (MOF) UiO-66-NH$_2$ and the elastomeric block copolymer poly(styrene-Mock-ethylene-ran-butylene-block-styrene) (SEBS) for improved performance over activated carbon-based protective textiles. Textiles incorporating the best MOF-composite materials reduces steady-state permeation of the chemical warfare agent (CWAs) simulant, 2-chloroethyl ethyl sulfide (CEES), by versus activated carbon cloth. Additionally, the protection capabilities of the composite beads may be further tuned by adjusting bead size—textiles fabricated from smaller composite beads show enhanced diffusional properties whereas textiles generated from larger beads maximize protective capacity. The elastomeric beads also do not exhibit any attrition when subjected to a hardness test, whereas traditional pressing techniques result in materials with only a 20% retention of particle size. Furthermore, composites with increasing MOF content result in enhanced chemical capacity and reactivity, with the best composite outperforming activated carbon cloth against the CWAs soman (91% versus 17% reacted, respectively) and mustard (97% versus 0% reacted, respectively) over 24 h. The 80 wt % samples also have ≈1.4 and 2.2× higher adsorption capacity for soman and CEES, respectively, versus carbon cloth. Finally, mixing multiple MOFs results in optimal composites for the simultaneous filtration of chlorine and ammonia.

Some example uses for the material provided by the embodiments herein include the fabrication of a woven or non-woven protective garment capable of decontaminating CWAs. Additional uses may include decontaminant wipes, or depending on the reactive component, a sensing material based on a colorimetric change. Moreover, the inclusion of inorganic materials will increase the flame resistance property of the resultant composite.

The foregoing description of the specific embodiments will so hilly reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A polymer-based material comprising:
   a polymeric binder; and
   one or more porous active materials that adsorb, chemisorb, decompose, or a combination thereof, a hazardous chemical,
   wherein the polymeric binder and the one or more porous active materials are combined to form a composite bead, and
   wherein said composite bead comprises the one or more porous active materials homogenously dispersed within the polymeric binder and the polymeric binder does not inhibit access to the pores of the porous active materials.

2. The polymer-based material of claim 1, wherein the polymeric binder comprises a polyurethane or a styrene-based block copolymer.

3. The polymer-based material of claim 1, wherein the one or more porous active materials is between 1 and 99 wt % of a total composite mass of the composite bead.

4. The polymer-based material of claim 1, wherein the one or more porous active materials is between 80 and 95 wt % of a total composite mass of the composite bead.

5. The polymer-based material of claim 1, wherein the hazardous chemical is selected from the group consisting of chemical warfare agents, simulants of chemical warfare agents, acidic and acid-forming chemicals, basic and base-forming chemicals, and toxic industrial chemicals.

6. The polymer-based material of claim 1, wherein the composite bead comprises a chemical treatment material that performs oxidation on the hazardous chemical.

7. The polymer-based material of claim 1, wherein the composite bead comprises a chemical treatment material that performs hydrolysis on the hazardous chemical.

8. The polymer-based material of claim 1, wherein the one or more porous active materials comprise any of metal oxides, metal hydroxides, metal hydrates and metal organic frameworks, cations or anions, chemical substitutions with chemical elements or mixtures thereof.

9. The polymer-based material of claim 8, wherein the chemical elements or mixtures thereof comprise any of iron (I, II, III, and/or IV) salts (chloride, sulfide, nitrate), iron (I, II, III, and/or IV) hydroxide, lanthanide oxides, lanthanide iron oxides, manganese (II, III, and/or IV) oxide, manganese tetraoxide, manganese (II, III, and/or IV) salts (chloride, sulfide, nitrate), cobalt (II, III) oxide, cobalt salts (chloride, sulfide, nitrate), nickel (II or III) oxide, copper (I or II) oxide, copper (II) hydroxide, copper (II) salts (chloride, sulfide, nitrate), and other metal salts, cerium, hafnium, titanium, aluminum, benzenedicarboxylic acid, aminoterephthalic acid, and benzenetricarboxylic acid.

10. The polymer-based material of claim 1, wherein the composite bead is configured to be incorporated into a garment.

11. The polymer-based material of claim 1, wherein the composite bead is configured to be incorporated into a filter.

12. The polymer-based material of claim 1, wherein the composite bead is configured to be incorporated into a film, wipe, fiber, or polymer.

13. The polymer-based material of claim 11, wherein the filter is to provide an end-of-service life indicator that interacts with the hazardous chemical.

14. The polymer-based material of claim 1, wherein the composite bead provides a residual life indicator showing interaction of the composite bead with the hazardous chemical.

15. The polymer-based material of claim 1, wherein the polymeric binder comprises a single component polymer or a blend of multiple polymers.

16. The polymer-based material of claim 1, wherein said composite bead includes a hierarchical pore structure.

17. The polymer-based material of claim 1, wherein said porous active materials are selected from the group consisting of metal organic framework UiO-66-$NH_2$, metal organic framework UiO-66, metal organic framework HKUST-1, and $Zr(OH)_4$, and said polymeric binder is selected from the group consisting of poly(styrene-block-ethylene-ran-butylene-block-styrene) (SEBS) and polyurethane.

18. The polymer-based material of claim 17, wherein said composite bead comprises about 80 wt % porous active material and about 20 wt % polymeric binder.

19. The polymer based material of claim 18, wherein said composite bead comprises about 80 wt % metal organic framework UiO-66-$NH_2$ and about 20 wt % poly(styrene-block-ethylene-ran-butylene-block-styrene) (SEBS).

20. The polymer-based material of claim 5, wherein said hazardous chemical is selected from the group consisting of sulfur mustard (HD), VX, tabun (GA), sarin (GB), soman (GD), 2-chloroethyl ethyl sulfide (2-CEES), dimethyl methylphosphonate (DMMP), dimethyl chlorophosphate (DMCP), diisopropyl methylphosphonate (DIMP), methyl dichlorophosphate (MDCP), and difluorphosphate (DFP), ammonia, hydrogen chloride, sulfur dioxide, hydrogen sulfide, and cyanogen chloride.

\* \* \* \* \*

UNITED STATES PATENT AND TRADEMARK OFFICE
CERTIFICATE OF CORRECTION

| | | |
|---|---|---|
| PATENT NO. | : 11,998,785 B1 | Page 1 of 1 |
| APPLICATION NO. | : 17/476478 | |
| DATED | : June 4, 2024 | |
| INVENTOR(S) | : Gregory W. Peterson, Thomas H. Epps and John M. Landers | |

It is certified that error appears in the above-identified patent and that said Letters Patent is hereby corrected as shown below:

On the Title Page

Correct name of inventor from: "Thomas H. Epps" to: "Thomas H. Epps, III"

Signed and Sealed this
Ninth Day of July, 2024

Katherine Kelly Vidal
*Director of the United States Patent and Trademark Office*